United States Patent
Chandra et al.

(10) Patent No.: US 10,603,612 B2
(45) Date of Patent: Mar. 31, 2020

(54) ELECTROMAGNET INTERFACE FOR A WATER FILTER ASSEMBLY

(71) Applicant: Haier US Appliance Solutions, Inc., Wilmington, DE (US)

(72) Inventors: Sharath Chandra, Hyderabad (IN); Naresh Suthar, Hyderabad (IN); Gregory Sergeevich Chernov, Louisville, KY (US); Koncha Chandra Sekhar, Hyderabad (IN); Allamneni Naga Tejaswini, Hyderabad (IN); Syed Moin Ahmed, Hyderabad (IN)

(73) Assignee: Haier US Applicance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/980,858

(22) Filed: May 16, 2018

(65) Prior Publication Data

US 2019/0351352 A1 Nov. 21, 2019

(51) Int. Cl.
*B01D 35/30* (2006.01)
*B01D 29/15* (2006.01)
*F25D 17/02* (2006.01)

(52) U.S. Cl.
CPC ........... *B01D 35/306* (2013.01); *B01D 29/15* (2013.01); *F25D 17/02* (2013.01); *B01D 2201/30* (2013.01); *B01D 2201/4069* (2013.01); *F25D 2317/00* (2013.01)

(58) Field of Classification Search
CPC .. B01D 35/306; B01D 29/15; B01D 2201/30; B01D 2201/4069; F25D 17/02; F25D 2317/00
USPC ........................ 210/232, 441–444, 455, 222
See application file for complete search history.

(56) References Cited

U.S. PATENT DOCUMENTS

| | | | |
|---|---|---|---|
| 6,632,355 B2 | 10/2003 | Fritze | |
| 7,506,666 B2 | 3/2009 | Tubby et al. | |
| 7,836,708 B2 | 11/2010 | Krause et al. | |
| 8,177,973 B2 | 5/2012 | Kennedy et al. | |
| 8,182,699 B2 | 5/2012 | Fritze | |
| 9,011,686 B2 | 4/2015 | Kirchner et al. | |
| 2014/0353233 A1* | 12/2014 | Dhiman | B01D 35/30 210/232 |

FOREIGN PATENT DOCUMENTS

| | | |
|---|---|---|
| CN | 202212062 U | 5/2012 |
| CN | 203790657 U | 8/2014 |
| KR | 20000074968 A | 12/2000 |

* cited by examiner

*Primary Examiner* — Madeline Gonzalez
(74) *Attorney, Agent, or Firm* — Dority & Manning, P.A.

(57) ABSTRACT

A water filter assembly is provided that includes features that facilitate mounting and removal of a water filter cartridge to and from a manifold. In particular, the water filter assembly includes an electromagnet interface that simplifies and aids mounting of the water filter cartridge to the manifold as well as removal therefrom.

20 Claims, 15 Drawing Sheets

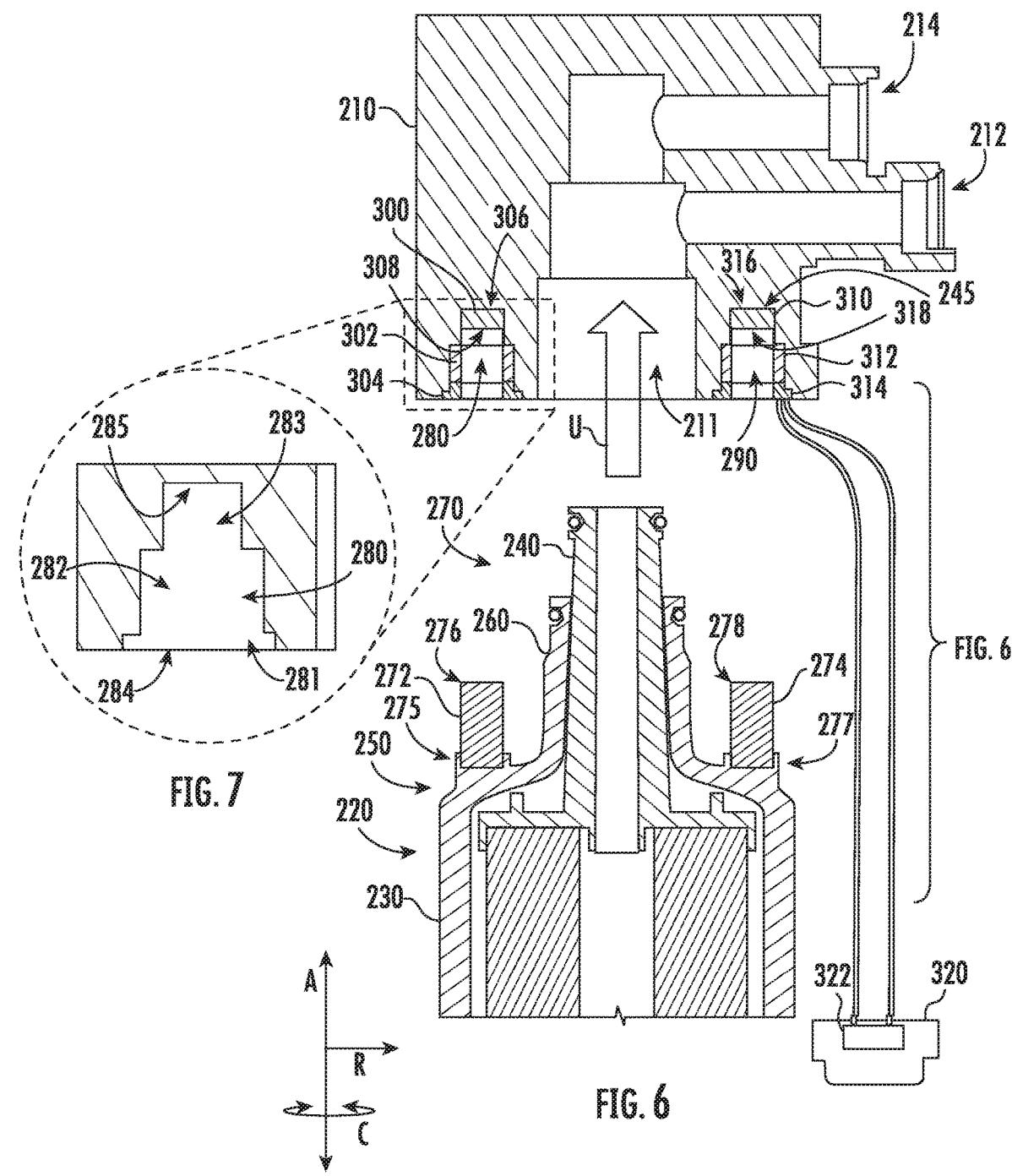

ELECTROMAGNET INTERFACE FOR A WATER FILTER ASSEMBLY

FIELD OF THE INVENTION

The present subject matter relates generally to water filter assemblies, such as water filter assemblies for refrigerator appliances.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In order to filter water, water filters are generally provided with a filter media, such as an activated carbon block. The water filter's filter media can adsorb or remove contaminants such as chlorine and lead from water prior to delivering such water to a user. For example, the water filter can filter water prior to such water entering the refrigerator's ice maker or water dispenser.

The activated carbon block has pores that permit a flow of water therethrough. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, the filtering capacity of the filtering media can decrease over time due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

To hinder such bacteria growth and insure that the filter media has not exceeded its filtering capacity, the water filter is preferably replaced or serviced about every six months regardless of its current performance. Removing and installing water filters can be messy and time consuming tasks. For example, when the water filter is removed from a manifold, the water filter is typically filled with water and such water can spill if the water filter is tipped or tilted during removal. However, tipping or tilting certain water filters can be required in order to remove certain water filters due to their location. Such spills can be time consuming and inconvenient to clean. Thus, certain consumers only replace their water filters long after the useful service life of their filters.

Accordingly, a water filter assembly that addresses one or more of the challenges noted above would be useful.

BRIEF DESCRIPTION OF THE INVENTION

Aspects and advantages of the invention will be set forth in part in the following description, or may be apparent from the description, or may be learned through practice of the invention.

In one exemplary embodiment, a water filter assembly is provided. The water filter assembly includes a manifold defining a cavity and a magnet disposed within the cavity. The water filter assembly also includes a conducting coil disposed within the cavity, the conducting coil in electrical communication with a power supply. Further, the water filter assembly includes a filter cartridge removably mounted to the manifold and comprising a housing that defines a chamber. Moreover, the water filter assembly includes a filter media disposed within the chamber. The water filter assembly also includes a magnetic member projecting from the housing of the filter cartridge. When the filter cartridge is mounted to the manifold, the magnetic member is received within the cavity of the manifold such that the conducting coil surrounds at least a portion of the magnetic member and the magnetic member is attracted to the magnet.

In another exemplary embodiment, a method for removing a filter cartridge from a manifold is provided. The filer cartridge includes a magnetic member and the manifold includes a magnet. The magnetic member being attracted to the magnet of the manifold when the filter cartridge is mounted to the manifold. The method includes shutting off a flow of water to the manifold. The method also includes inducing a magnetic field such that the magnetic member of the filter cartridge is repelled from the magnet of the manifold.

In yet another exemplary embodiment, a water filter assembly defining an axial direction, a radial direction, and a circumferential direction is provided. The water filter assembly includes a manifold defining a cavity, the manifold comprising a first mounting housing defining a first cavity and a second mounting housing defining a second cavity. The water filter assembly also includes a first magnet disposed within the first cavity and a second magnet disposed within the second cavity. Further, the water filter assembly includes a first conducting coil disposed within the first cavity, the first conducting coil in electrical communication with a power supply. The water filter assembly also includes a second conducting coil disposed within the second cavity, the second conducting coil in electrical communication with the power supply. In addition, the water filter assembly includes a filter cartridge removably mounted to the manifold and defining a chamber. A filter media is disposed within the chamber. The filter cartridge includes a housing. A first magnetic member projects from the housing in a first direction that is substantially orthogonal to the axial direction. A second magnetic member projects from the housing in a second direction that is substantially orthogonal to the axial direction. When the filter cartridge is mounted to the manifold, the first magnetic member is received within the first cavity such that the first conducting coil surrounds at least a portion of the first magnetic member and the first magnetic member is attracted to the first magnet and the second magnetic member is received within the second cavity such that the second conducting coil surrounds at least a portion of the second magnetic member and the second magnetic member is attracted to the second magnet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 6 provides a close up, cross sectional view of the filter cartridge removed from the manifold of the water filter assembly of FIG. 3;

FIG. 7 provides a close up view of Section 7 of FIG. 6 depicting a cavity defined by the manifold;

DETAILED DESCRIPTION

Figure 1:
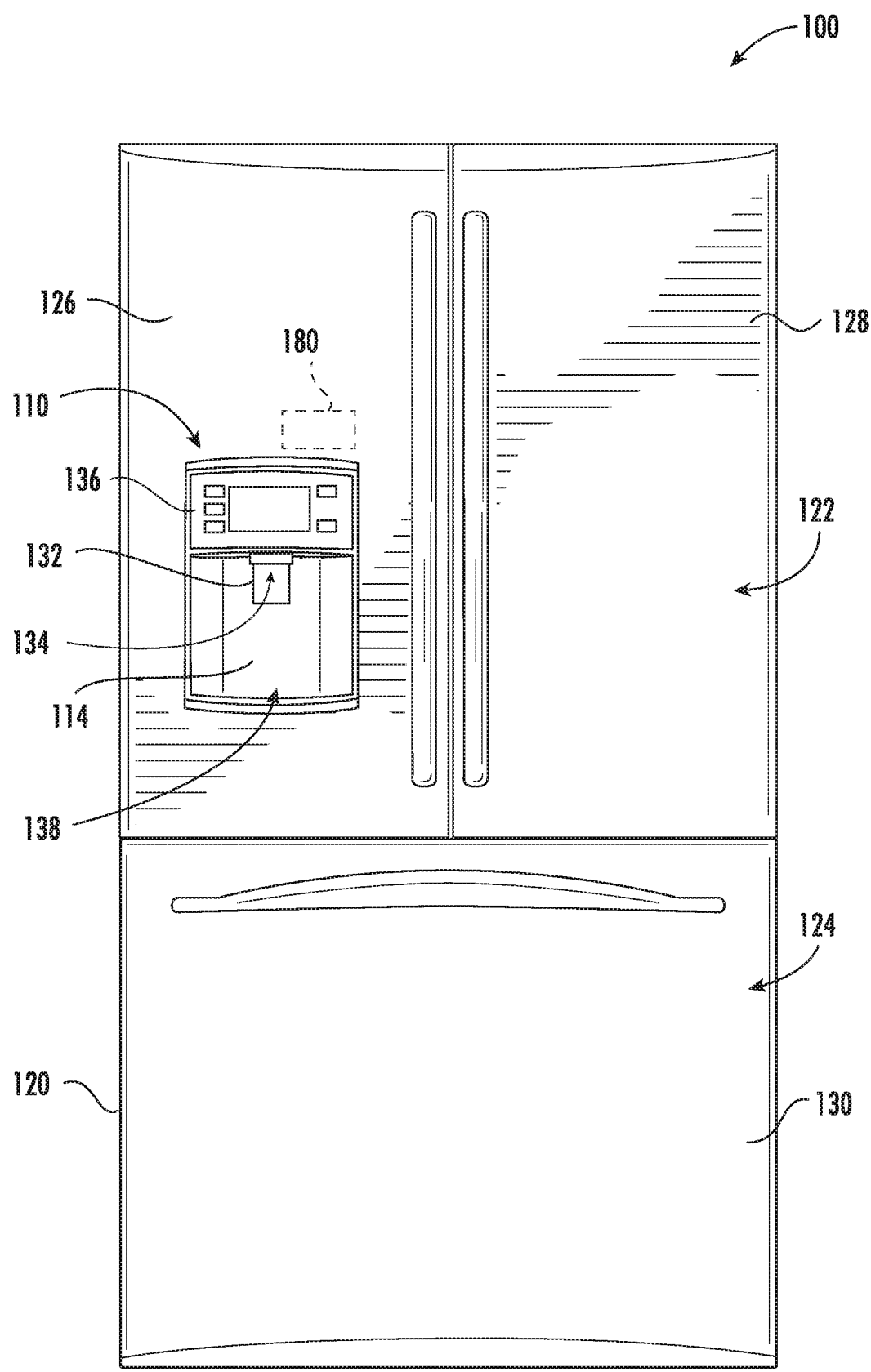
FIG. 1 provides a front, elevation view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In the exemplary embodiment, housing 120 also defines a mechanical compartment (not shown) for receipt of a sealed cooling system. Using the teachings disclosed herein, it will be understand that the present subject matter can be used with other types of refrigerators (e.g., side-by-sides top mount). Thus, the description set forth herein is provided by way of example only and is not intended to limit the present subject matter to any particular arrangement or placement within an appliance.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access freezer chamber 124. In the exemplary embodiment, recessed portion 138 is positioned at a level that approximates the chest level of a user.

Figure 2:
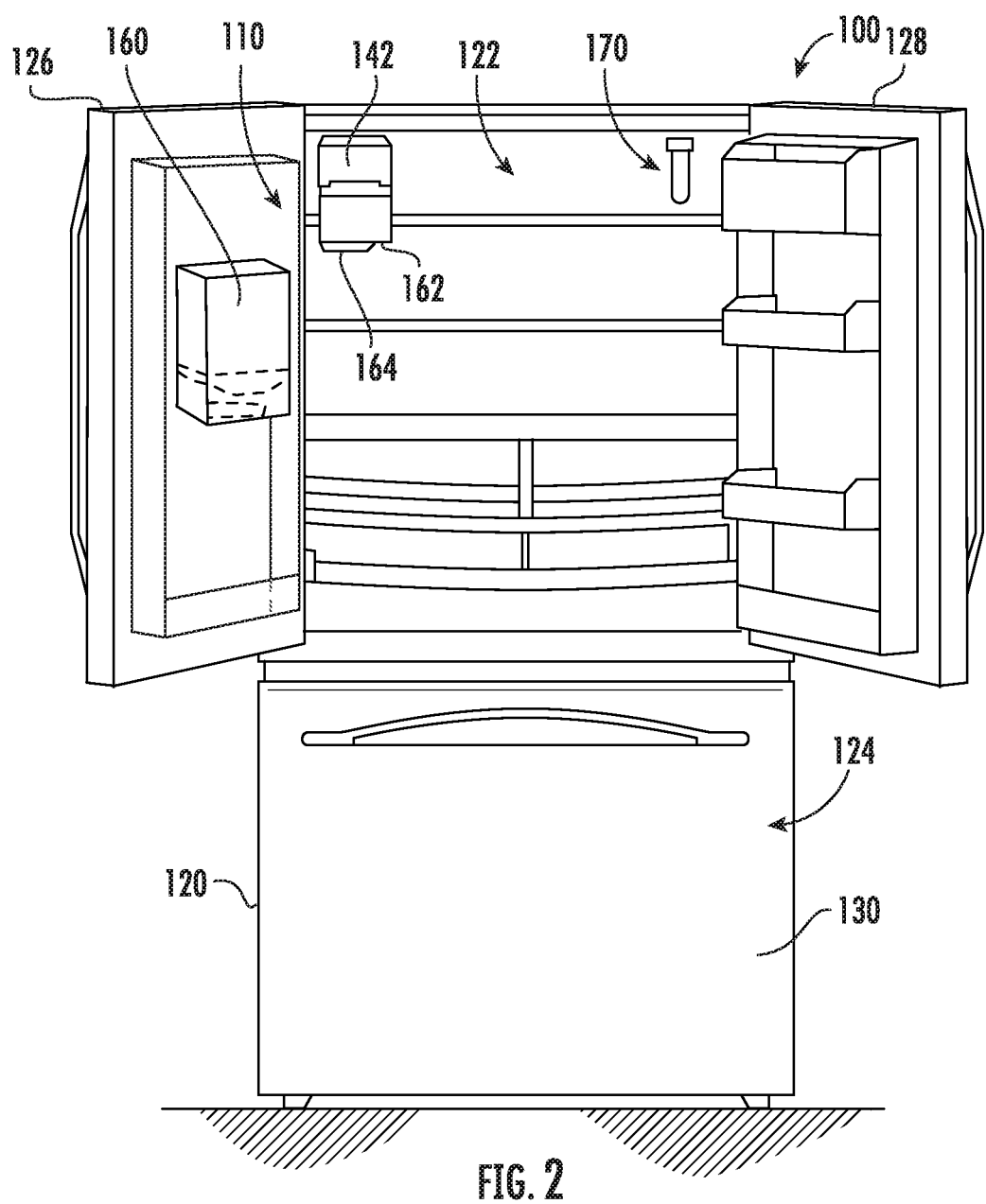
FIG. 2 provides a front, elevation view of the refrigerator appliance of FIG. 1 with refrigerator doors of the refrigerator appliance shown in an open configuration to reveal a fresh food chamber of the refrigerator appliance.

FIG. 2 provides a perspective view of refrigerator appliance 100 having refrigerator doors 126, 128 in an open position to reveal the interior of fresh food chamber 122. As such, certain components of dispensing assembly 110 are illustrated. Dispensing assembly 110 includes an insulated housing 142 mounted within refrigerator chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. More particularly, insulated housing 142 contains an ice maker for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As door 126 is closed or opened, receptacle 160 is moved in and out of position under insulated housing 142.

In an alternative exemplary embodiment, insulated housing 142 and its ice maker can be positioned directly on door 126. In still another exemplary embodiment, the ice maker could be located on the door for the freezer compartment and directly over receptacle 160, e.g., in a configuration where the fresh food compartment and the freezer compartment are located side by side (as opposed to over and under as shown in FIGS. 1 and 2). As such, the use of an insulated housing would be unnecessary. Other configurations for the location of receptacle 160, an ice maker, and/or insulated housing 142 may be used as well.

As shown in FIG. 1, operation of the refrigerator appliance 100 is regulated by a controller 180 that is operatively coupled to user interface panel 136 and/or activation member 132. Panel 136 provides input selectors for user manipulation of the operation of refrigerator appliance 100 such as e.g., selections between whole or crushed ice, chilled water, and/or other options as well. In response to user manipulation of the user interface panel 136, the controller 180 operates various components of the refrigerator appliance 100. The controller 180 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller 180 may be positioned in a variety of locations throughout refrigerator appliance 100. For example, the controller 180 may be located within beneath the user interface panel 136 on door 126. In such an embodiment, input/output ("I/O") signals may be routed between the controller 180 and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface 136 may be in communication with the controller 180 via one or more signal lines or shared communication busses.

As depicted in FIG. 2, refrigerator appliance 100 also includes a water filter assembly 170 for filtering water coming into refrigerator appliance 100 from a water supply (not shown), such as a municipal water source or a well. Water filter assembly 170 can remove contaminants, such as chlorine, chloroform, lead, arsenic, pharmaceuticals, microbes, etc., from water supplied to refrigerator appliance 100. In particular, water filter assembly 170 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics and other chemical compounds or substances.

Figure 3:
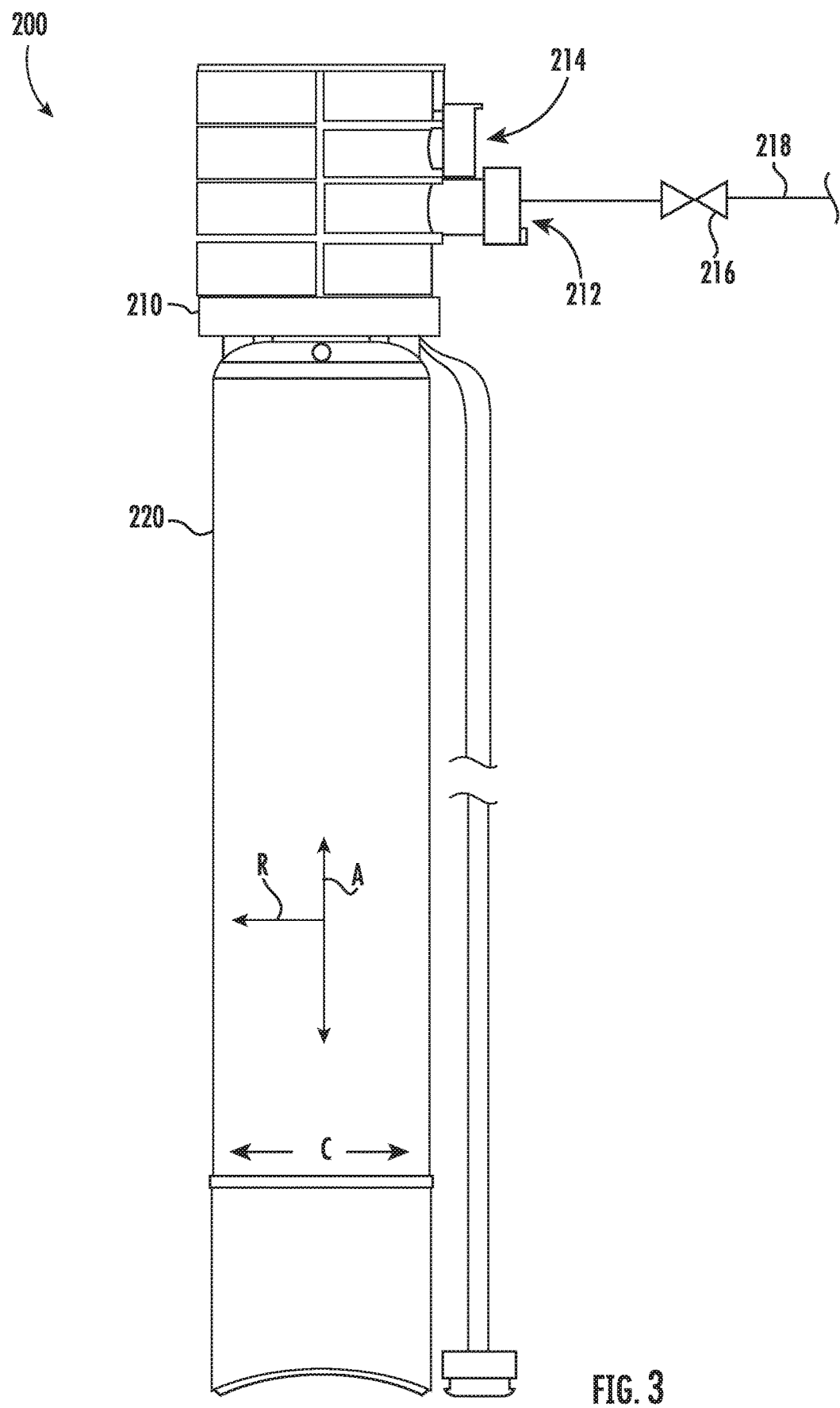
FIG. 3 provides a schematic, front elevation view of a water filter assembly according to an exemplary embodiment of the present disclosure.

FIG. 3 provides a schematic, front elevation view of a water filter assembly 200 according to an exemplary embodiment of the present disclosure. Water filter assembly 200 may be used in the refrigerator appliance 100, e.g., as water filter assembly 170 (FIG. 2). In alternative exemplary embodiments, water filter assembly 200 may be used in any other suitable appliance, such as an ice maker, as a point of use water filtration system, e.g., installed beneath a sink or for use with a shower, as part of a gravity fed filtration system, or as a point of entry water filtration system for an entire household. Thus, the present subject matter is not limited to any particular installation or location for water filter assembly 200.

Water filter assembly 200 defines an axial direction A, a radial direction R, and a circumferential direction C extending three hundred sixty degrees (360°) about the axial direction A. Water filter assembly 200 includes a manifold 210 and a filter cartridge 220 removably mounted to manifold 210. Although not shown, manifold 210 may include a mounting bracket for mounting water filter assembly 200, e.g., to housing 120 of refrigerator appliance 100 (FIG. 2), to a kitchen cabinet beneath a kitchen sink, or to a wall within a house. Manifold 210 defines an inlet 212 and an outlet 214. Inlet 212 may be in fluid communication with a water supply and may receive unfiltered water from the water supply. From inlet 212, such unfiltered water is directed into filter cartridge 220. Such unfiltered water passes through filter cartridge 220 and exits manifold 210 at outlet 214 as filtered water. Such filtered water may, e.g., be directed to the ice maker within insulated housing 142 (FIG. 2), discharging outlet 134 (FIG. 2), a kitchen sink faucet, and/or any other suitable use. In some embodiments, the inlet 212 and the outlet 214 may be reversed.

Notably, the unfiltered water flowing into manifold 210 through inlet 212 may be pressurized. For instance, the incoming water may be pressurized between about twenty and one hundred twenty pounds per square inch (20-120 psi). Additionally, as shown in FIG. 3, a valve 216 may be positioned along a supply conduit 218 to selectively allow a flow of unfiltered water to flow downstream to water filter assembly 200. Supply conduit 218 may provide fluid communication between water supply and water filter assembly 200. Valve 216 may be communicatively coupled with controller 180 so that valve 216 may be selectively actuated between an open position and a closed position, e.g., to allow or cut off the flow of unfiltered water to water filter assembly 200.

Figure 4:
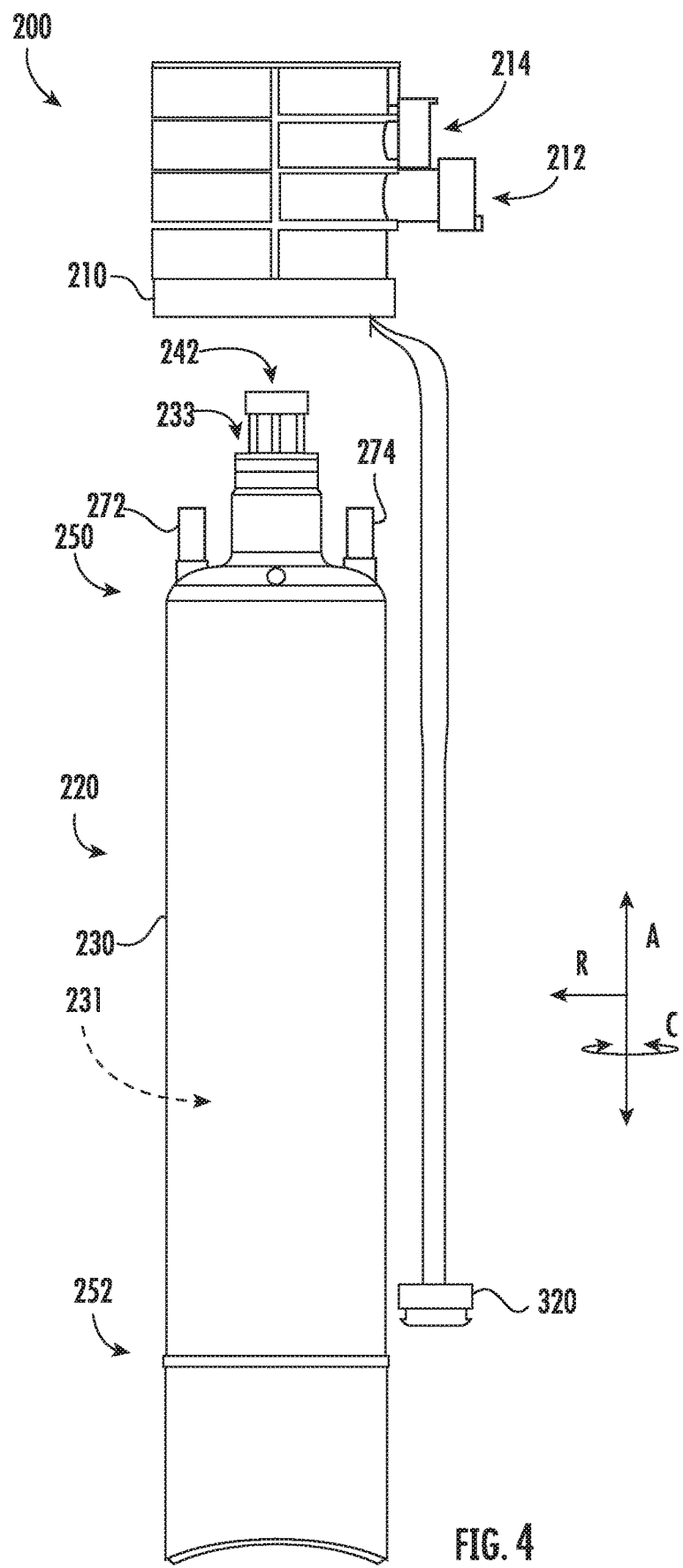
FIG. 4 provides a front elevation view of the water filter assembly of FIG. 3 depicting a filter cartridge removed from a manifold of the water filter assembly.

FIG. 4 provides a front elevation view of water filter assembly 200 of FIG. 3 depicting filter cartridge 220 removed from manifold 210. As shown, filter cartridge 220 includes a casing, sheath or housing 230 that defines an interior volume or chamber 231. Housing 230, e.g., an annular sidewall of housing 230, extends between a top portion 250 and a bottom portion 252, e.g., along the axial direction A. Housing 230 also defines an opening 233 at top portion 250 of housing 230. Opening 233 permits access to chamber 231 of housing 230. Housing 230 may have only one opening 233 through housing 230 to chamber 231, in certain exemplary embodiments, e.g., such that all fluid flow into and out of chamber 231 passes through opening 233.

Figure 5:
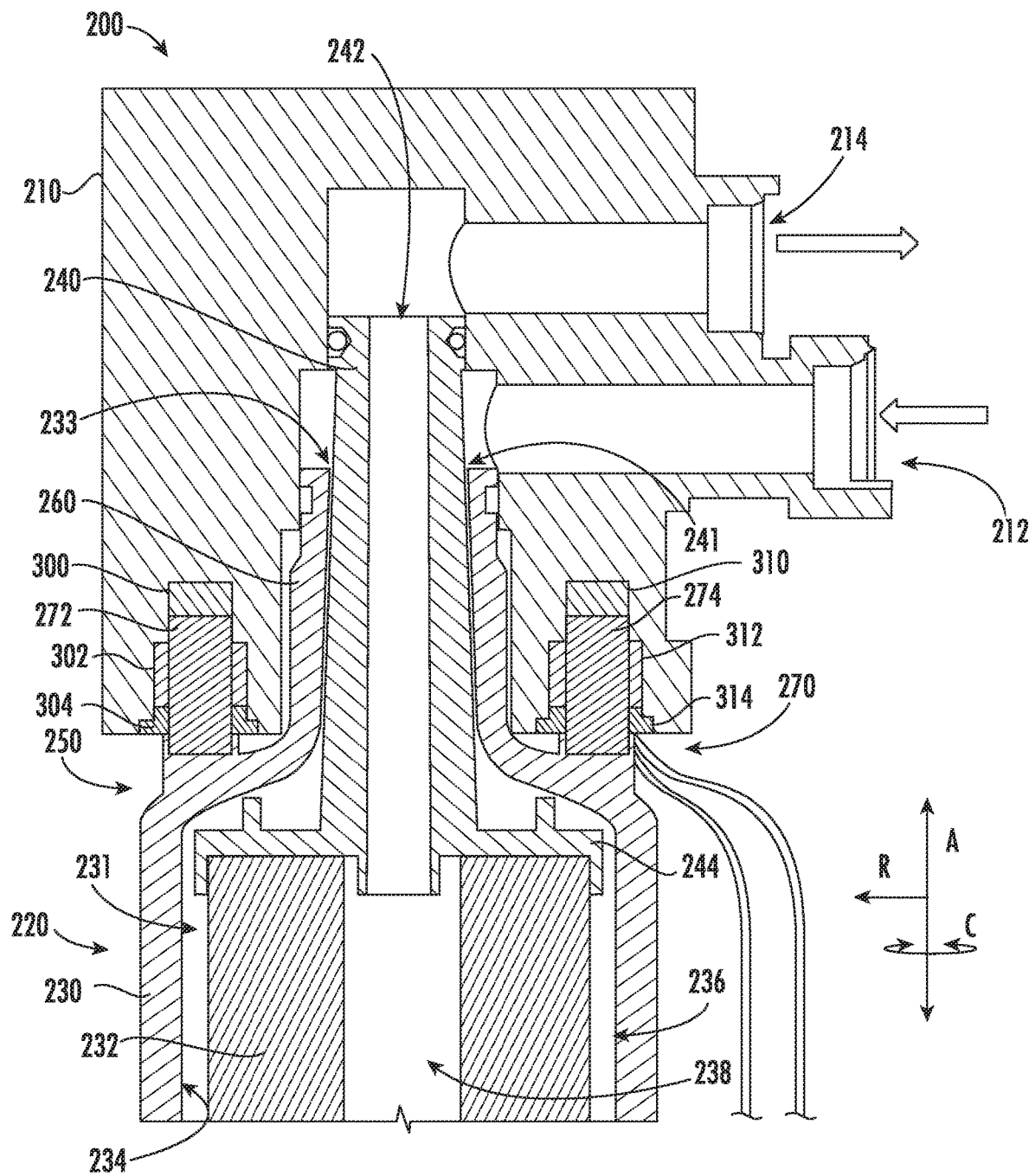
FIG. 5 provides a close up, cross sectional view of the filter cartridge mounted to the manifold of the water filter assembly of FIG. 3.

FIG. 5 provides a close up, cross sectional view of filter cartridge 220 mounted to manifold 210. As shown, housing 230 of filter cartridge 220 includes a port or neck 260, e.g., at top portion 250 of housing 230. Opening 233 may be positioned at or defined at neck 260 of housing 230. As shown in FIG. 5, a sleeve 240 is received within opening 233 at neck 260. When inserted, sleeve 240 defines a first passage or inlet 241 and a second passage or outlet 242 of filter cartridge 220. Inlet 241 is in fluid communication with inlet 212 of manifold 210 and with chamber 231 of housing 230. Thus, unfiltered water can enter chamber 231 of housing 230 through inlet 241. Outlet 242 is in fluid communication with outlet 214 of manifold 210 and chamber 231 of housing 230. Thus, filtered water can exit chamber 231 of housing 230 through outlet 242.

A filter media 232 is disposed within chamber 231. Filter media 232 is spaced apart from an inner surface 234 of housing 230, e.g., along the radial direction R, within chamber 231. A cap 244 of sleeve 240 may be positioned within chamber 231 on filter media 232 at top portion 250 of housing 230 in order to define a radial gap between inner surface 234 of housing 230 and an outer surface of filter media 232. As an example, cap 244 may be glued or in some other manner fixed to filter media 232 in order to define the radial gap, position filter media 232 vertically, and block potential bypass flow around filter media 232 to outlet 242.

Filter media 232 also divides chamber 231 into an unfiltered volume 236 and a filtered volume 238. Filter media 232 can remove impurities and contaminants from water passing through filter media 232 from the unfiltered volume 236 to the filtered volume 238. Filter media 232 may include any suitable mechanism for filtering water such as, e.g., ceramic filters, activated carbon filters, polymer filters, membrane filters, sediment type filters, or reverse osmosis filters. As used herein, the term "unfiltered" describes a volume within chamber 231 that is not filtered relative to filter media 232. However, it will be understood that water filter assembly 200 may include additional filters that filter water entering chamber 231. Thus, "unfiltered volume" may be filtered relative to other filters but not filter media 232.

As an example, water passing though water filter assembly 200 can follow a path through water filter assembly 200. In particular, unfiltered water can enter water filter assembly 200 through inlet 212 of manifold 210. Such unfiltered water can then flow though inlet 241 into the unfiltered volume 236 of chamber 231. Such unfiltered water can pass though filter media 232 to remove impurities and can exit filter media 232 into the filtered volume 238 of chamber 231 as filtered water. Such filtered water can then pass through outlet 242 and exit water filter assembly 200 through outlet 214 of manifold 210.

In such a manner, unfiltered water can follow the path through water filter assembly 200. In particular, unfiltered water can pass though filter media 232, and filtered water can exit water filter assembly 200. Such filtering can improve taste and/or safety of water. However, effectiveness of filter media 232 can decrease over time, e.g., due to pores of filter media 232 becoming clogged, pore surfaces becoming saturated with contaminates, and/or bacteria can accumulate or grow within filter media 232 over time. Thus, filter media 232 and/or filter cartridge 220 may require replacement or servicing after a certain time interval in order to maintain proper operation of water filter assembly 200. In particular, filter media 232 and/or filter cartridge 220 may require replacement or servicing about every six months. In accordance with exemplary aspects of the present disclosure, as discussed in greater detail below, water filter assembly 200 includes features that facilitate removal and mounting of filter cartridge 220 from or to manifold 210 of water filter assembly 200.

With reference now to FIGS. 5, 6, and 7, one exemplary embodiment of a filter interface assembly 270 of water filter assembly 200 will be described. FIG. 6 provides a close up, cross sectional view of filter cartridge 220 removed from manifold 210. FIG. 7 provides a close up view of Section 7 of FIG. 6 depicting a first cavity 280 defined by manifold 210. The various components of filter interface assembly 270 allow filter cartridge 220 to be readily mounted or removed from manifold 210.

As shown particularly in FIG. 6, filter cartridge 220 includes a first magnetic member 272 and a second magnetic member 274 projecting from housing 230 at top portion 250 of filter cartridge 220. In particular, for this embodiment, first magnetic member 272 and second magnetic member 274 each have a length projecting or extending from housing 230 of filter cartridge 220 along the axial direction A. First magnetic member 272 extends between a proximal end 275 and a distal end 276, e.g., along the axial direction A, and second magnetic member 274 extends between a proximal end 277 and a distal end 278, e.g., along the axial direction A. Moreover, for this embodiment, first magnetic member 272 and second magnetic member 274 extend from housing 230 or are positioned radially opposite one another. That is, first magnetic member 272 and second magnetic member 274 are positioned about one hundred eighty degrees (180°) from one another along the radial direction R. First magnetic member 272 and second magnetic member 274 may be made of any suitable magnetic material, e.g., a ferromagnetic material. For this embodiment, first magnetic member 272 and second magnetic member 274 are each iron rods that are attached to housing 230 of filter cartridge 220. More particularly, as shown, first magnetic member 272 and second magnetic member 274 are each over molded onto housing 230 of filter cartridge 220 at their respective proximal ends 275, 277. In alternative exemplary embodiments, first magnetic member 272 and second magnetic member 274 may be attached to or affixed to housing 230 in any suitable manner.

Further, in addition to defining a main chamber 211 configured to receive a portion of sleeve 240 and neck 260 of filter cartridge 220 when filter cartridge 220 is mounted to manifold 210, manifold 210 defines a first cavity 280 and a second cavity 290. First cavity 280 and second cavity 290 are defined by manifold 210 radially opposite one another along radial direction R. First cavity 280 and second cavity 290 are each stepped cavities. In particular, as shown particular in FIG. 7, a close up of first cavity 280 is provided (with various components removed from first cavity 280 for illustrative purposes). As depicted, first cavity 280 includes a first step portion 281 located at or adjacent an opening 284 of first cavity 280. A second step portion 282 is contiguous with and positioned adjacent to first step portion 281. Second step portion 282 has a smaller diameter than first step portion 281. A third step portion 283 is contiguous with and positioned adjacent to second step portion 282. Third step portion 283 has a smaller diameter than second step portion 282 of first cavity 280. Second cavity 290 is configured in the same manner as first cavity 280.

With reference to FIGS. 6 and 7, as shown, a first magnet 300 is disposed within first cavity 280. In particular, first magnet 300 is disposed within third step portion 283 (FIG. 7) of first cavity 280. First magnet 300 extends between and attachment surface 306 and a contact surface 308, e.g., along the axial direction A. First magnet 300 is attached to the sidewalls of third step portion 283 and attachment surface 306 is attached to top wall 285 (FIG. 7) of first cavity 280. In addition, a first conducting coil 302 is disposed within second step portion 282 of first cavity 280. An annular first cap 304 is disposed within first step portion 281 adjacent opening 284 of first cavity 280. First cap 304 is attached to the sidewalls of first step portion 281 and second step portion 282. First cap 304 secures first conducting coil 302 in place, e.g., positioned within second step portion 282, and is positioned between first conducting coil 302 and opening 284 of first cavity 280. Accordingly, first cap 304 provides a barrier to protect first conducting coil 302 from moisture.

Similarly, a second magnet 310 is disposed within second cavity 290. More specifically, as shown in FIG. 6, second magnet 310 is disposed within third step portion (not labeled) of second cavity 290. Second magnet 310 is attached to one or both of the sidewalls of third step portion and top wall 295 of second cavity 290. Further, a second conducting coil 312 is disposed within second step portion (not labeled) of second cavity 290. An annular second cap 314 is disposed within first step portion (not labeled) adjacent opening 284 of second cavity 290. Second cap 314 is attached to the sidewalls of first step portion and second step portion that define second cavity 290. Second cap 314 secures second conducting coil 312 in place, e.g., positioned within second step portion of second cavity 290, and is positioned between second conducting coil 312 and opening 294 of second cavity 20. Thus, second cap 314 provides a barrier to protect second conducting coil 312 from moisture.

As further shown in FIG. 6, for this embodiment, filter interface assembly 170 includes an activation mechanism 320 that is in electrical communication with second conducting coil 312, e.g., via electrical wires. Although not shown, it will be appreciated that activation mechanism 320 may also be in electrical communication with first conducting coil 302. When activation mechanism 320 is activated, a current is passed from a power supply 322 (e.g., a battery) through second conducting coil 312 (and/or first conducting coil 302) to induce a magnetic field. As will be explained further below, by inducing a magnetic field, the polarity of one or both of the first and second magnetic members 272, 274 of filter cartridge 220 may be reversed. As such, one or both of first and second magnetic members 272, 274 may either be repelled by or attracted to their respective first and second magnets 300, 310. This may ease removal of filter cartridge 220 from manifold 210 or may secure filter cartridge 220 to manifold 210. Activation mechanism 320 may be any suitable device that allows a user to activate the flow of current through one or both of first and second conducting coils 302, 312. As one example, activation mechanism 320 is a push button. As another example, activation mechanism 320 is an input selector of panel 136 (FIG. 1). As yet another example, activation mechanism 320 is a user device communicatively coupled with controller 180 of refrigerator appliance 100.

One exemplary manner in which filter cartridge 220 may be mounted to manifold 210 will now be described with reference to FIGS. 5 and 6. First, filter cartridge 220 is inserted into manifold 210. In particular, neck 260 of filter cartridge 220 and sleeve 240 are aligned with main chamber 211, first magnetic member 272 of filter cartridge 220 is aligned with first cavity 280, and second magnetic member 274 of filter cartridge 220 is aligned with second cavity 290. Once these various components are aligned, filter cartridge 220 is moved upward, denoted as arrow U in FIG. 6, toward manifold 210 along the axial direction A. As shown in FIG. 5, when filter cartridge 220 is mounted to manifold 210, neck 260 of filter cartridge 220 and sleeve 240 are received within main chamber 211 of manifold 210, first magnetic member 272 is received within first cavity 280, and second magnetic member 274 is received within second cavity 290.

Further, when first magnetic member 272 is inserted into and received within first cavity 280, first magnetic member 272 becomes magnetized by first magnet 300, and accordingly, distal end 276 of first magnetic member 272 fixes to first magnet 300 due to the magnetic attraction between first magnetic member 272 and first magnet 300. Moreover, when first magnetic member 272 is inserted into and received within first cavity 280, a middle portion of first magnetic member 272 is surrounded by first conducting coil 302. Similarly, when second magnetic member 272 is inserted into and received within second cavity 290, second magnetic member 274 becomes magnetized by second magnet 310, and thus, distal end 278 of second magnetic member 274 fixes to second magnet 310 due to the magnetic attraction between second magnetic member 274 and second magnet 300. Accordingly, when filter cartridge 220 is inserted into manifold 210, filter cartridge 220 is secured to and held in place by the magnetic attraction between first magnetic member 272 and first magnet 300 as well as second magnetic member 274 and second magnet 310. Further, as shown, when second magnetic member 274 is inserted into and received within second cavity 290, a middle portion of second magnetic member 274 is surrounded by second conducting coil 302.

In addition, preferably, before mounting filter cartridge 220 to manifold 210, the water supplied to water filter assembly 200 is turned off. Refrigerator appliance 100 or another appliance for which water filter assembly 200 provides filtering capability may include features that ensure safe mounting of filter cartridge 220 to manifold 210.

Figure 8:
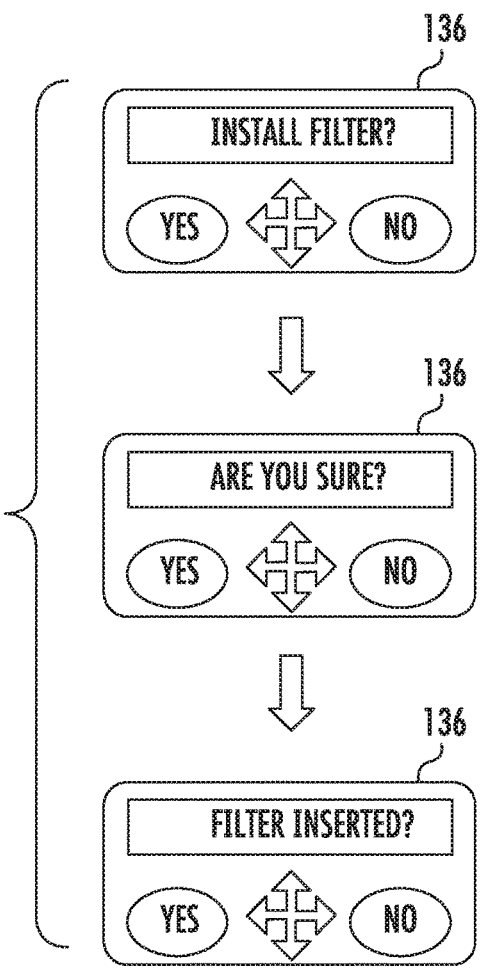
FIG. 8 provides a sequence flow chart of one exemplary method for ensuring safe installation of the filter cartridge to the manifold according to an exemplary embodiment of the present disclosure.

FIG. 8 provides a sequence flow chart of one exemplary method for ensuring safe installation of filter cartridge 220 to manifold 210 according to an exemplary embodiment of the present disclosure. As shown, prior to mounting filter cartridge 220 to manifold 210, a user may use input selectors and display of user interface panel 136 to indicate that filter installation is desired. A user may select "Yes" when prompted "Install filter?" on the display of user interface panel 136. To confirm, the user may be prompted with a confirmation prompt "Are you sure?" The user may confirm by once again selecting "Yes." Once a user has communicated a desire to install a filter and confirmed such intent, controller 180 (FIG. 1) controls valve 216 (FIG. 3) to move to a closed position, which effectively shuts off the water flowing to water filter assembly 200. As such, filter cartridge 220 may safely be mounted to manifold 210 (i.e., without pressurized water spilling out). Once the installation is complete, a user may then confirm that filter cartridge 220 is mounted to manifold 210 by selecting "Yes" to the prompt "Filter installed?" Upon confirmation, controller 180 controls valve 216 to an open position such that water may resume flowing into water filter assembly 200 for filtering. It will be appreciated that other methods ensuring safe installation of filter cartridge 220 to manifold 210 are possible.

Figure 9:
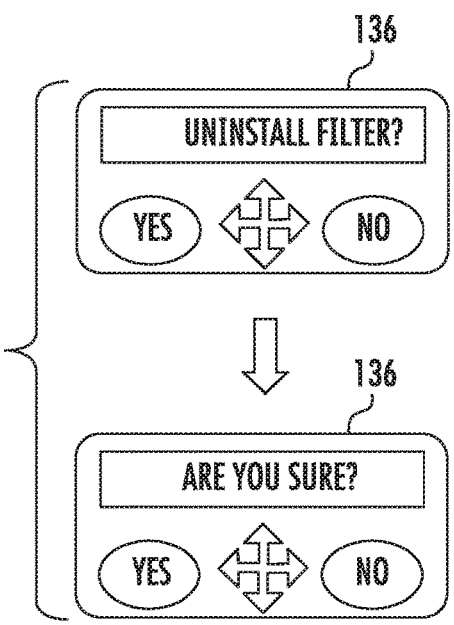
FIG. 9 provides a sequence flow chart of one exemplary method for ensuring safe removal of the filter cartridge from the manifold according to an exemplary embodiment of the present disclosure.
Figure 10:
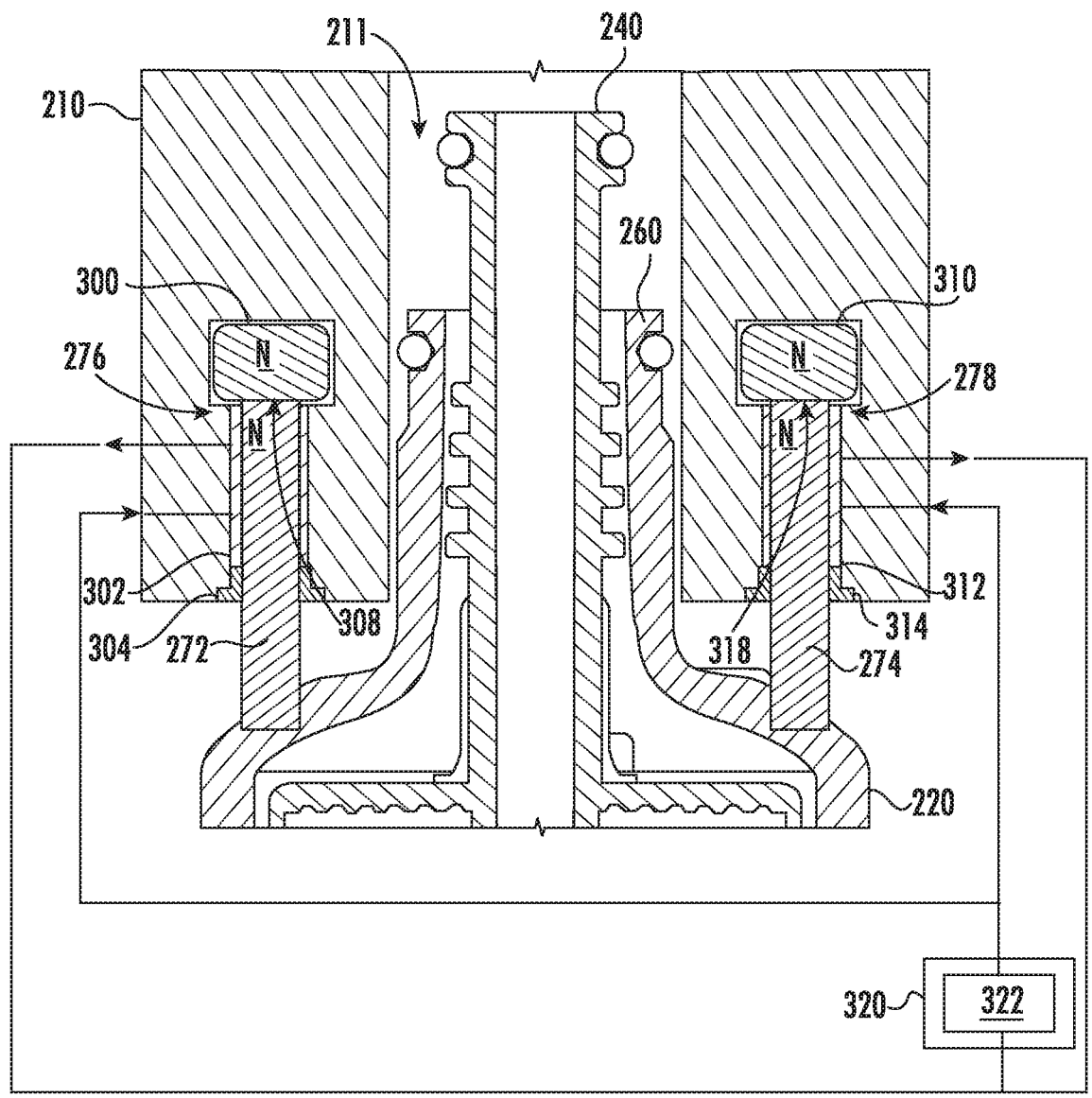
FIG. 10 provides a close up, schematic cross sectional view of the filter cartridge being removed from the manifold of the water filter assembly of FIG. 3.

One exemplary manner in which filter cartridge 220 may be removed from manifold 210 will now be described with reference to FIGS. 5, 6, 9, and 10. FIG. 9 provides a sequence flow chart of one exemplary method for ensuring safe removal of filter cartridge 220 to manifold 210 according to an exemplary embodiment of the present disclosure. FIG. 10 provides a close up, schematic cross sectional view of an electric current being supplied to first conducting coil 302 and second conducting coil 312 to release first magnetic member 272 from first magnet 300 and second magnetic member 274 from second magnet 310 such that filter cartridge 220 may be removed from manifold 210.

As shown particularly in FIG. 9, prior to removing filter cartridge 220 from manifold 210, a user may use input selectors and display of user interface panel 136 to indicate that filter removal is desired. A user may select "Yes" when prompted "Uninstall filter?" on the display of user interface panel 136. To confirm, the user may be prompted with a confirmation prompt "Are you sure?" The user may confirm by once again selecting "Yes." Once a user has communicated a desire to remove filter cartridge 220 from manifold 210 and confirmed such intent, controller 180 (FIG. 1) controls valve 216 (FIG. 3) to move to a closed position so that the flow of water is shut off to manifold 210 or water filter assembly 200. As such, filter cartridge 220 may be safely removed from manifold 210 (i.e., without pressurized water spilling out).

Figure 18:
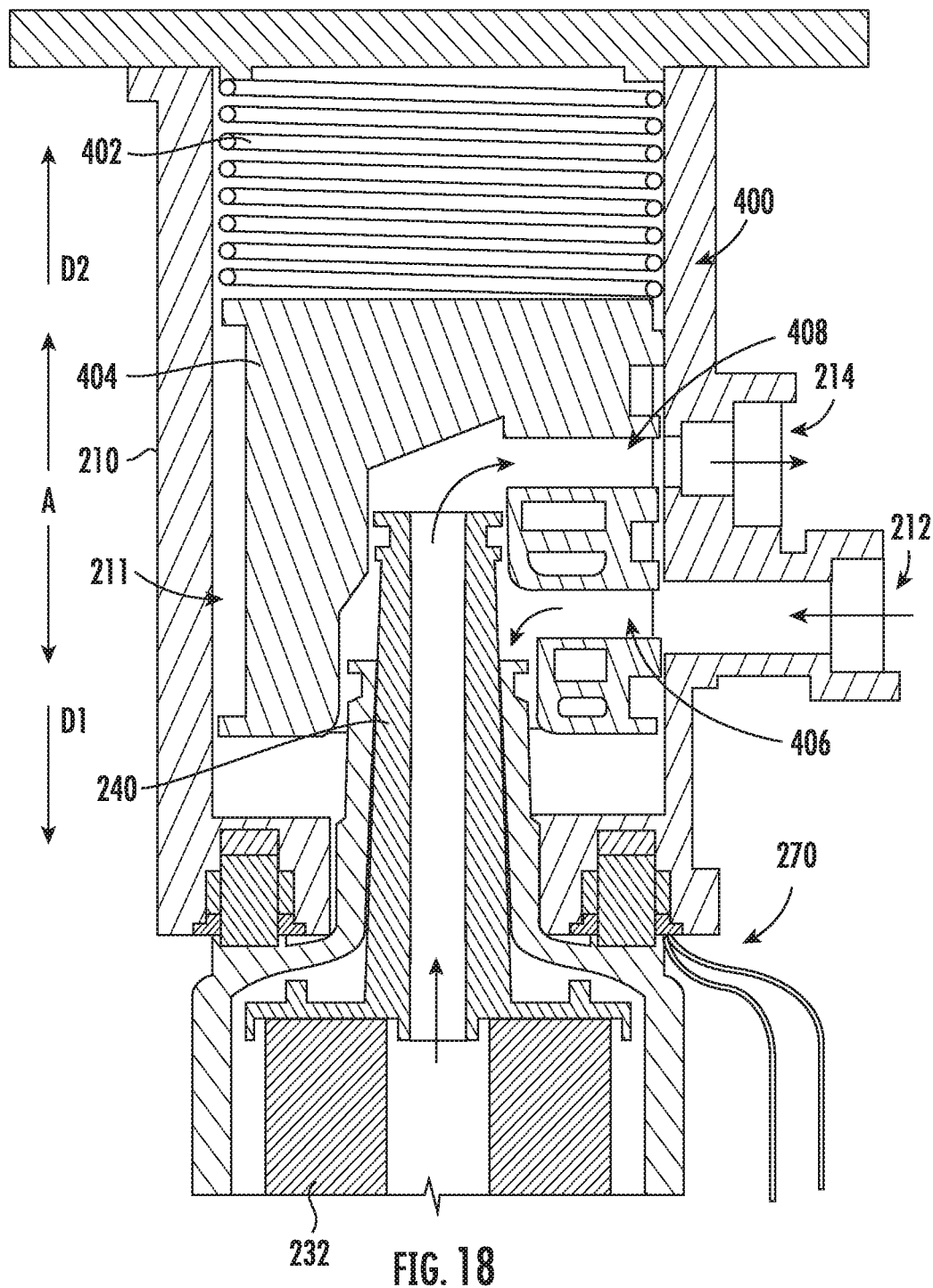
FIG. 18 provides a close up, cross sectional view of a filter cartridge mounted to a manifold having an exemplary water shutoff assembly disposed within a main chamber defined by the manifold according to an exemplary embodiment of the present disclosure.
Figure 19:
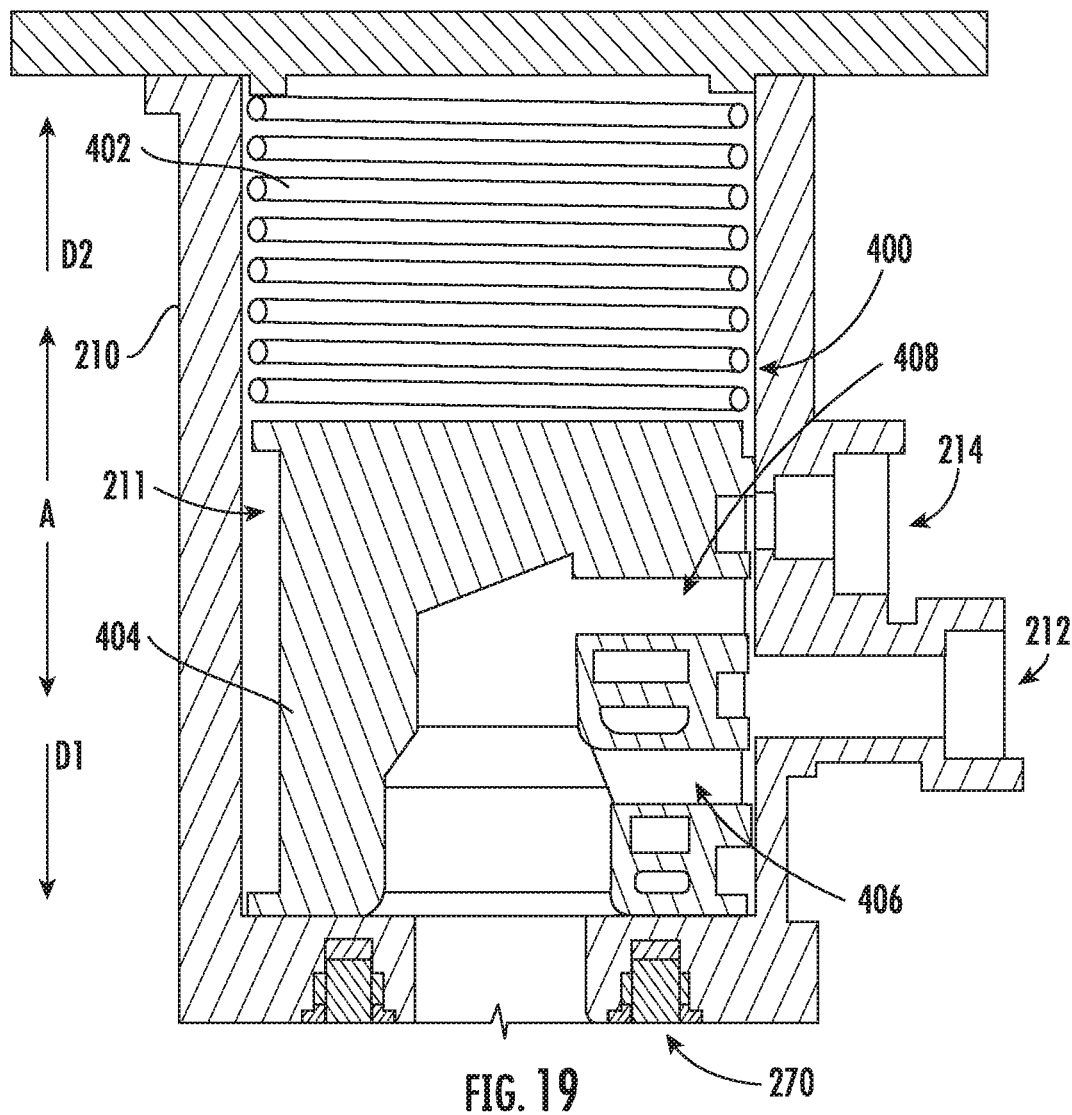
FIG. 19 provides a close up, cross sectional view of the manifold and the exemplary water shutoff assembly disposed within the main chamber defined by the manifold with the filter cartridge removed from the manifold according to an exemplary embodiment of the present disclosure.

In alternative exemplary embodiments, refrigerator appliance 100 or another appliance for which water filter assembly 200 provides filtering capability may include mechanical features that ensure safe mounting and removal of filter cartridge 220 to manifold 210. As one example, FIGS. 18 and 19 provide cross sectional views of manifold 210 and depict a water shutoff assembly 400 disposed therein for shutting off the flow of water to manifold 210 when filter cartridge 220 is removed from manifold 210 and allowing a flow of water to manifold 210 when filer cartridge 220 is mounted thereto. For this embodiment, main chamber 211 is defined by manifold 210 in a generally cylindrical shape that extends substantially along the axial length of manifold 210. Water shutoff assembly 400 includes a spring 402 and a chute 404 that are each received within main chamber 211. In particular, chute 404 is slideably received within main chamber 211 and is movable along the axial direction A. Chute 404 is movable in a first direction D1 along the axial direction A by spring 402, which is a downward direction in this embodiment. That is, when filter cartridge 220 is removed from manifold 210, spring 402 expands causing chute 404 to move in the first direction D1. Chute is movable in a second direction D2 along the axial direction A by sleeve 240 and neck 260 of filter cartridge 220 as filter cartridge 220 is mounted to manifold 210. In this embodiment, the second direction D2 is an upward direction along the axial direction A. When filter cartridge 220 is mounted to manifold 210, sleeve 240 and neck 260 force chute 404 in the second direction D2 and overcome the spring force of spring 402, which causes spring 402 to compress, e.g., as shown in FIG. 18. The various components of filter interface assembly 270 lock filter cartridge 220, chute 404, and spring 402 in place, e.g., along the axial direction A. Accordingly, chute 404 is movable between a first position (FIG. 19) and a second position (FIG. 18) along the axial direction A.

Chute 404 defines an inlet passage 406 and an outlet passage 408. As shown in FIG. 19, when chute 404 is the first position, inlet passage 406 is not in fluid communication with inlet 212 of manifold 210 and outlet passage 408 is not in fluid communication with outlet 214 of manifold 210, and thus, water is shutoff from manifold 210. In contrast, as shown in FIG. 18, when chute 404 is the second position, inlet passage 406 is in fluid communication with inlet 212 of manifold 210 and outlet passage 408 is in fluid communication with outlet 214 of manifold 210, and thus, water is allowed to flow through manifold 210 and ultimately be filtered by filter media 232.

Returning now to FIG. 6, after shutting off the water flow to water filter assembly 200, filter cartridge 220 may be removed from manifold 210. To do so, for this example, a user activates activation mechanism 320 such that electric current is directed from a power supply through one or both of first and second conducting coils 302, 312 surrounding first and second magnetic members 272, 274, respectively. When electric current passes through the coils 302, 312, a magnetic field is generated around or about the coils according to Ampere's right-hand rule. In turn, a magnetic field is induced in first and second magnetic members 272, 274. By controlling the flow direction of electric current through the coils 302, 312, the magnetic polarity at distal ends 276, 278 of first magnetic member 272 and second magnetic member 274 may be reversed, respectively. In particular, electric current can be directed through first conducting coil 302 such that distal end 276 of first magnetic member 272 has a magnetic polarity that is the same as the magnetic polarity of contact surface 308 of first magnet 300 and/or electric current can be directed through second conducting coil 312 such that distal end 278 of second magnetic member 274 has a magnetic polarity that is the same as the magnetic polarity of contact surface 318 of second magnet 310.

As shown in FIG. 10, in this example, electric current is directed from power supply 322 through first conducting coil 302 such that distal end 276 of first magnetic member 272 has a north N or negative polarity and contact surface 308 of first magnet 300 likewise has a north N or negative polarity. Electric current is similarly directed through second conducting coil 312 such that distal end 278 of second magnetic member 274 has a north or negative polarity and contact surface 318 of second magnet 310 likewise has a north or negative polarity. Accordingly, distal end 276 of first magnetic member 272 is repelled from contact surface 308 of first magnet 300 and distal end 278 of second magnetic member 274 is repelled from contact surface 318 of second magnet 310. As this occurs, filter cartridge 220 is released from manifold 210, and thus, filter cartridge 220 may be removed from manifold 210. Notably, electric current is needed and used only momentarily to release filter cartridge 220 from manifold 210.

As described above, filter cartridge 220 is removably mounted to manifold 210 by electromagnet features that facilitate mounting and removal of filter cartridge 220 from manifold 210. Notably, for the example embodiment above, a user need not rotate or twist filter cartridge 220 to mount or remove filter cartridge 220 to or from manifold 210. Further, a user need not forcibly remove filter cartridge 220 from manifold 210; rather, a user may use activation mechanism 320 and its circuitry to readily remove filter cartridge 220 from manifold 210.

Figure 11:
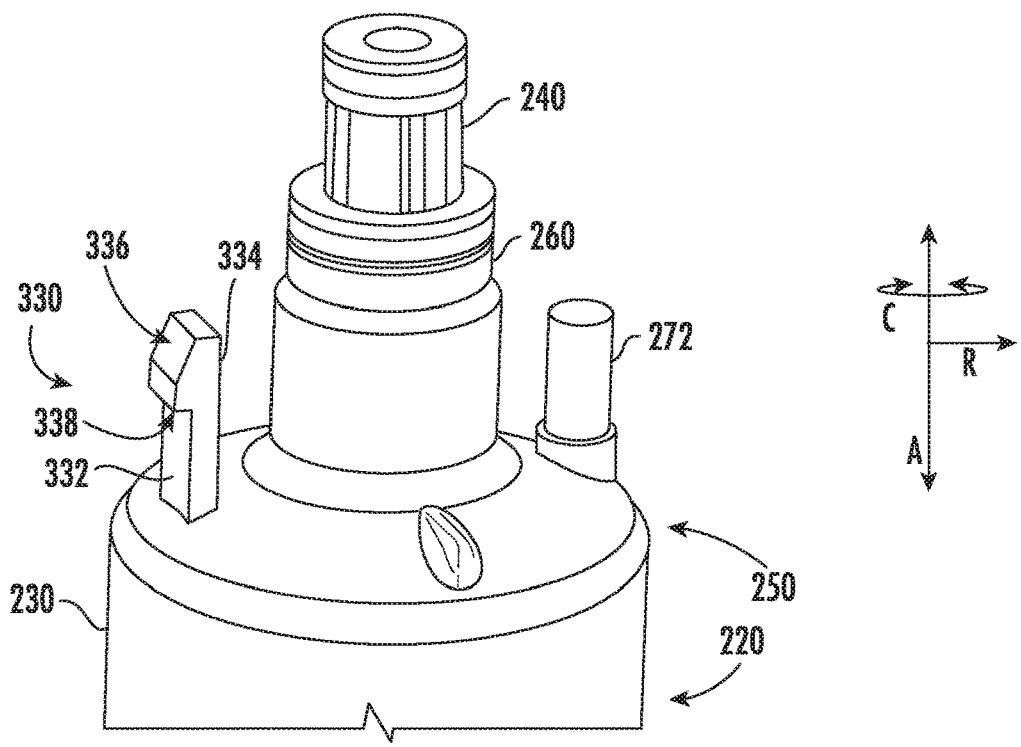
FIG. 11 provides a close up, perspective view of a top portion of a filter cartridge of another exemplary water filter assembly according to an exemplary embodiment of the present disclosure.
Figure 12:
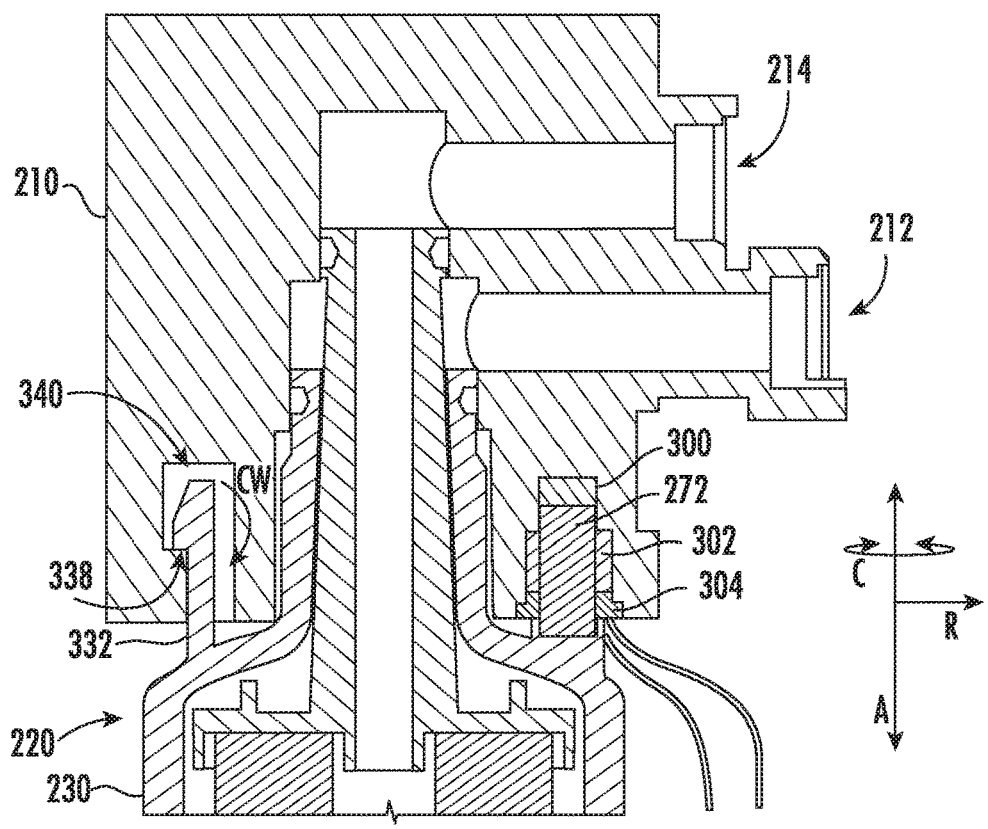
FIG. 12 provides a close up, cross sectional view of the filter cartridge of FIG. 11 mounted to a manifold.
Figure 13:
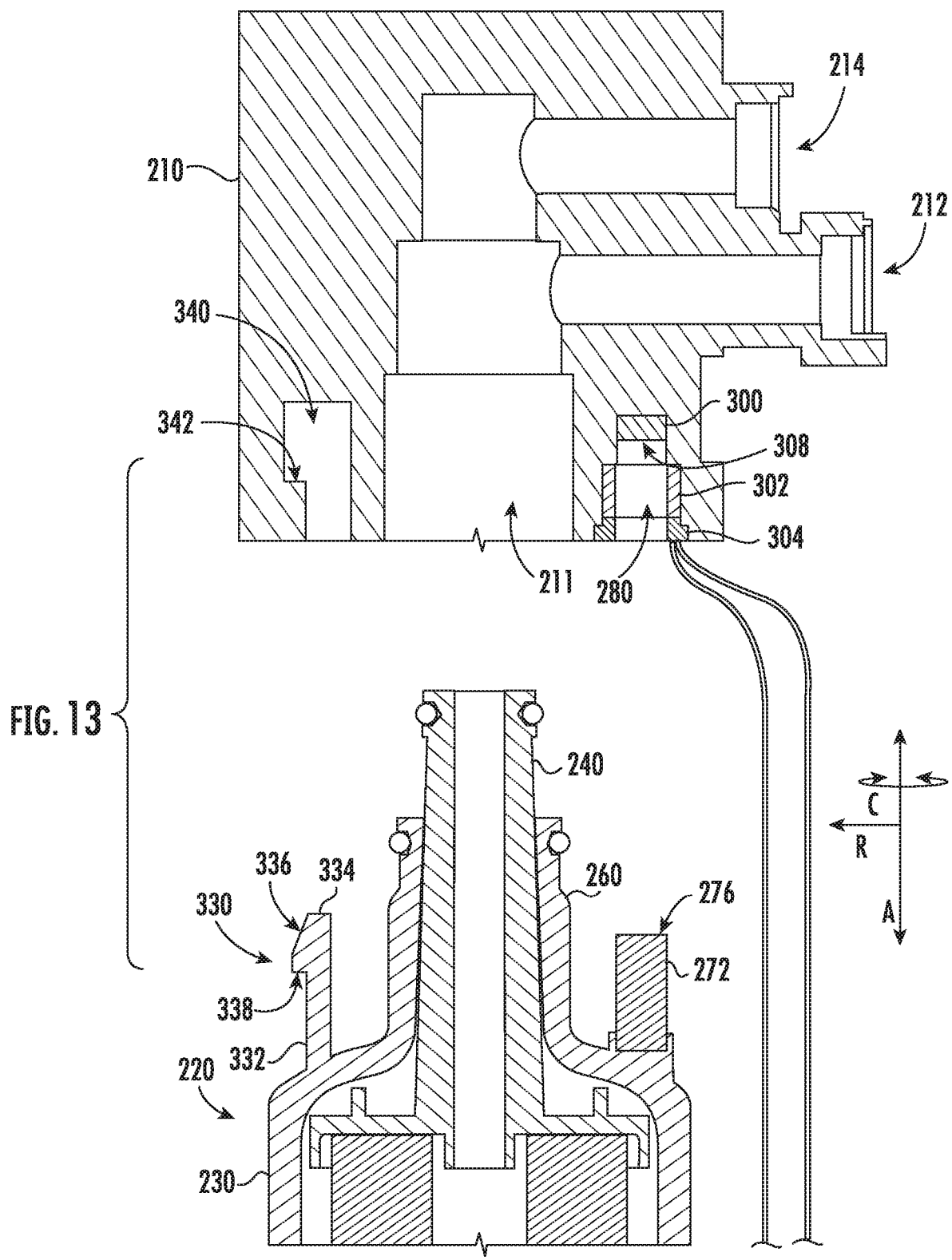
FIG. 13 provides a close up, cross sectional view of the filter cartridge of FIG. 11 removed from the manifold.

FIGS. 11, 12, and 13 provide another exemplary embodiment of water filter assembly 200. In particular, FIG. 11 provides a close up view of top portion 250 of filter cartridge 220, FIG. 12 provides a close up, cross sectional view of filter cartridge 220 mounted to manifold 210, and FIG. 13 provides a close up, cross sectional view of filter cartridge 220 removed from manifold 210. The exemplary water filter assembly 200 of FIGS. 11 through 13 is configured in a similar manner as the water filter assembly of FIGS. 3 through 10, and accordingly, the same or similar reference numerals will refer to the same or similar parts.

By contrast with the water filter assembly of FIGS. 3 through 10, water filter assembly 200 of FIGS. 11 through 13 includes a single magnetic member, denoted as first magnetic member 272, extending from housing 230 of filter cartridge 220. Further, as shown, for this embodiment, filter cartridge 220 includes a snap member 330 spaced from first magnetic member 272, e.g., along the circumferential direction C, and positioned radially opposite of first magnetic member 272 along the radial direction R. Snap member 330 extends from housing 230, e.g., along the axial direction A.

Snap member 330 includes a shaft 332 and a head 334. Head 334 includes a ramped wedge 336 that facilitates insertion of snap member 330 into a groove 340 defined by manifold 210 (FIG. 12). Head 334 of snap member 330 also includes a contact surface 338 that is configured to contact a support surface 342 that defines groove 340 of manifold 210 when filter cartridge 220 is mounted to manifold 210. Snap member 330 is configured to secure filter cartridge 220 to manifold 210 and to counteract a hinge moment about first magnetic member 272. Snap member 330 may be formed of any suitable material. For instance, in this embodiment, snap member 330 is formed of a plastic material. Further, for this embodiment, snap member 330 is formed integrally with housing 230 of filter cartridge 220 as a single component. However, in alternative exemplary embodiments, snap member 330 may be attached to the housing 230 of filter cartridge 220.

Filter cartridge 220 may be mounted to manifold 210 in a similar manner as described above except as provided below. In particular, as shown in FIG. 13, as neck 260 of filter cartridge 220 and sleeve 240 are inserted into main chamber 211 of manifold 210 and first magnetic member 272 is inserted into first cavity 280, snap member 330 is inserted into groove 340 of manifold 210. Ramped wedge 336 of head 334 facilitates and eases snap member 330 into groove 340. When filter cartridge 220 is fully inserted into manifold 210 as shown in FIG. 12, head 334 of snap member 330 snaps into place such that contact surface 338 of head 334 contacts a support surface 342 (FIG. 13) of manifold 210. The mating engagement of contact surface 338 with support surface 342 secures filter cartridge 220 to manifold 210. In addition, when filter cartridge 220 is mounted to manifold 210, first magnetic member 272 is magnetized by first magnet 300, and accordingly, the magnetic attraction between first magnet 300 and first magnetic member 272 further secures filter cartridge 220 to manifold 210.

Filter cartridge 220 may be removed from manifold 210 in a similar manner as described above except as provided below. For this embodiment, first magnetic member 272 is released from first magnet 300 as described above (e.g. electric current may be directed to first conducting coil 302 such that the magnetic polarity of contact surface 308 of first magnet 300 is the same as distal end 276 of first magnetic member 272). As noted above, electric current is needed only momentarily to release filter cartridge 220 from manifold 210. Once first magnetic member 272 is released from first magnet 300, filter cartridge 220 pivots about the attachment point of contact surface 338 with support surface 342 in a clockwise direction CW from the perspective of FIG. 12. The pivotal movement of filter cartridge 220 relative to manifold 210 allows contact surface 338 of snap member 330 to release from support surface 342 of manifold 210. In this way, snap member 330 may be removed from groove 340, which ultimately allows filter cartridge 220 to be removed from manifold 210.

Advantageously, for this embodiment, filter cartridge 220 only includes a single magnetic member and manifold 210 includes a single set of electromagnetic components. In this way, the number of components needed for the electromagnetic interface between filter cartridge 220 and manifold 210 is reduced. Further, instead of first magnetic member 272 being formed of a ferromagnetic material, snap member 330 may be formed of a plastic material, as noted above. This may reduce the cost of water filter assembly 200, for example.

Figure 14:
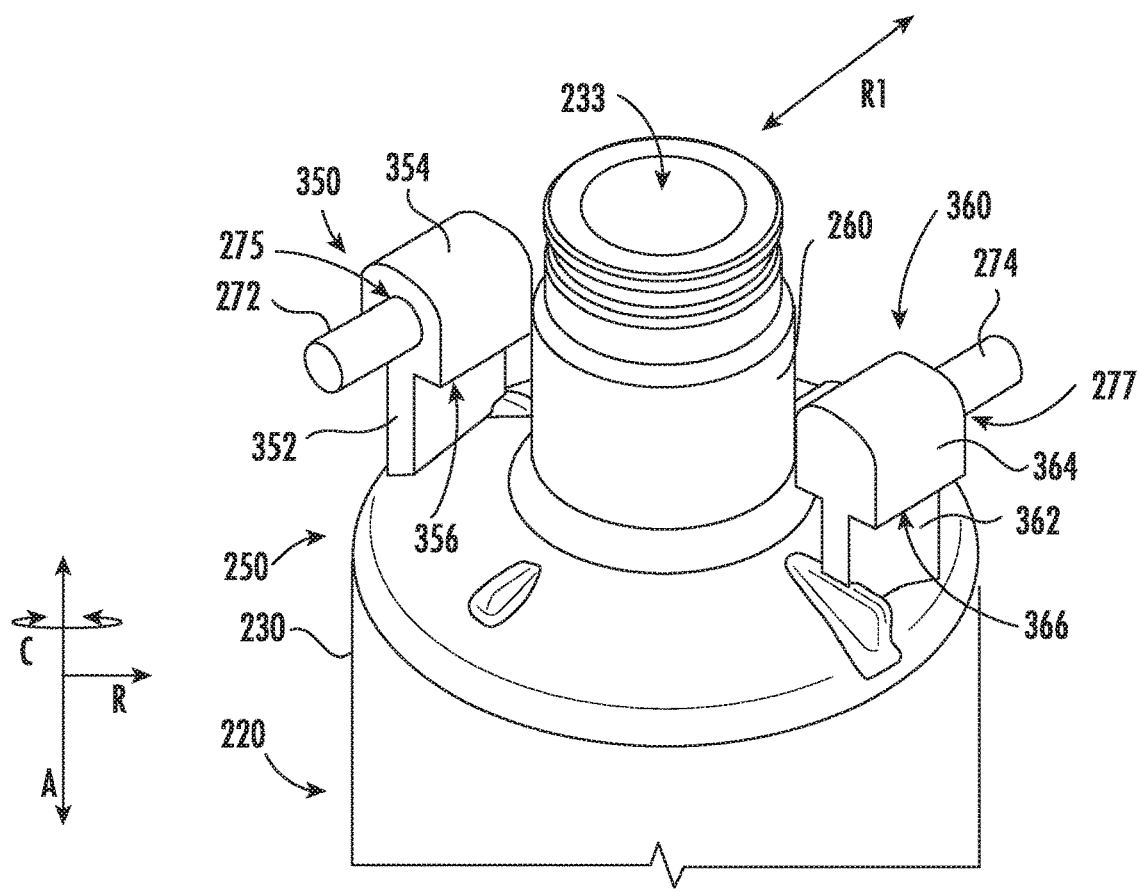
FIG. 14 provides a close up view of a top portion of a filter cartridge of another exemplary water filter assembly according to an exemplary embodiment of the present disclosure.
Figure 15:
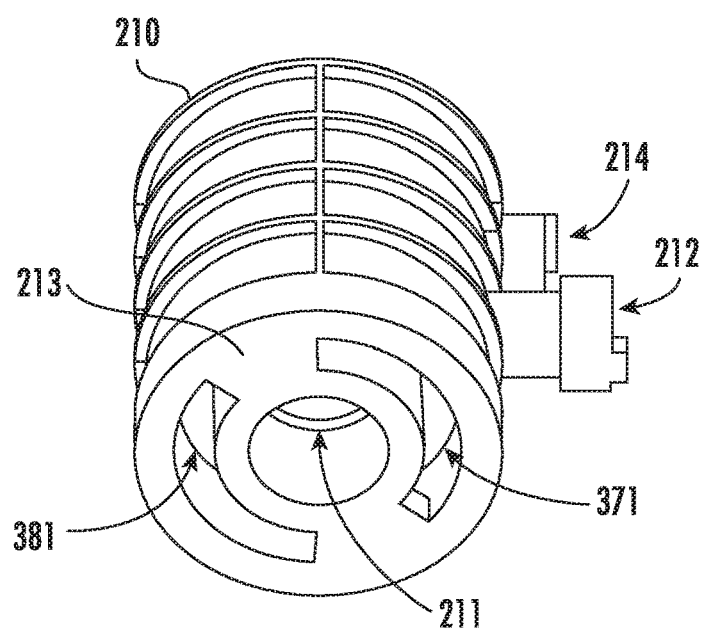
FIG. 15 provides a bottom perspective view of a manifold of the water filter assembly of FIG. 14.
Figure 16:
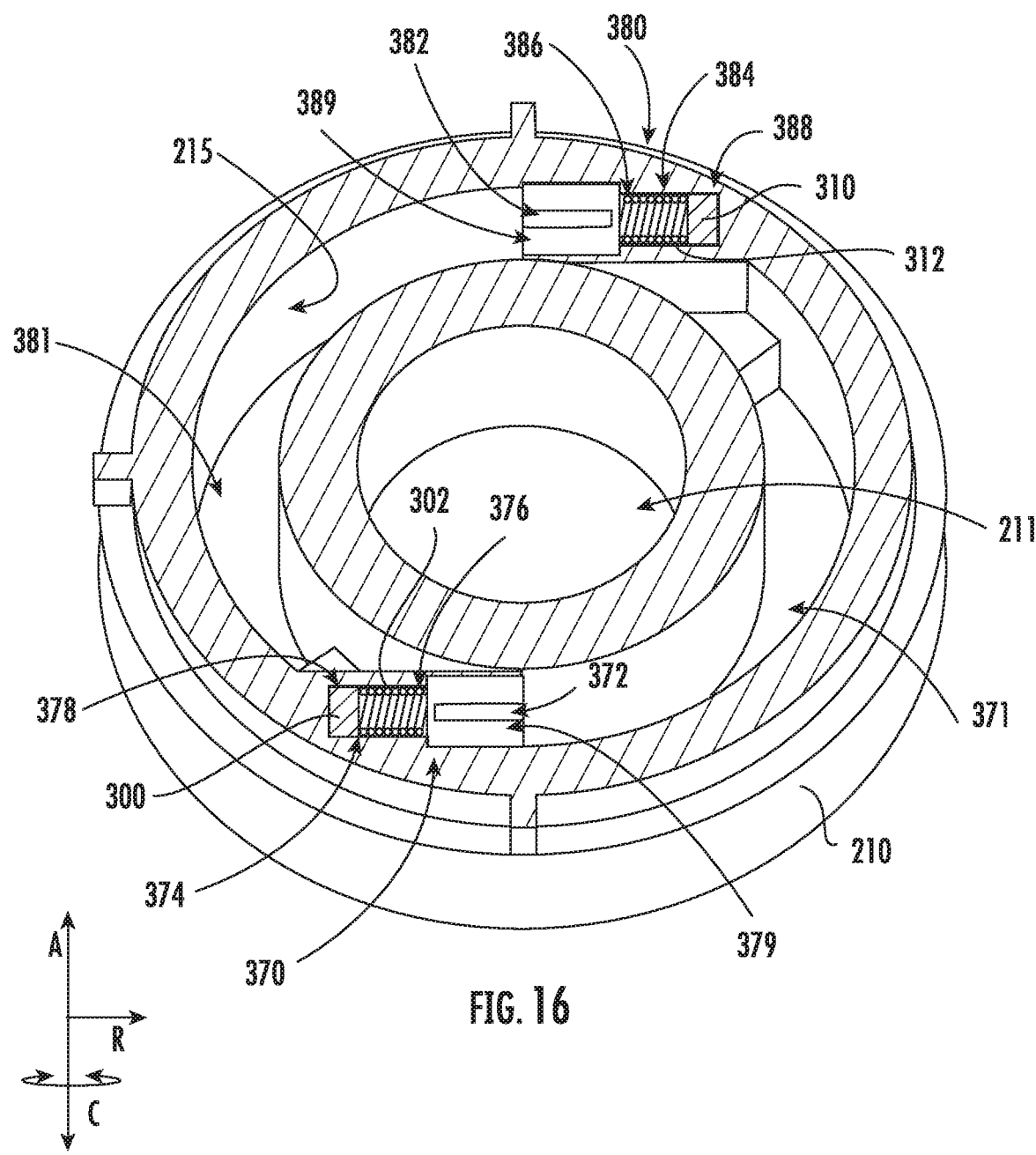
FIG. 16 provides a close up, perspective cross sectional view of the manifold of FIG. 15.
Figure 17:
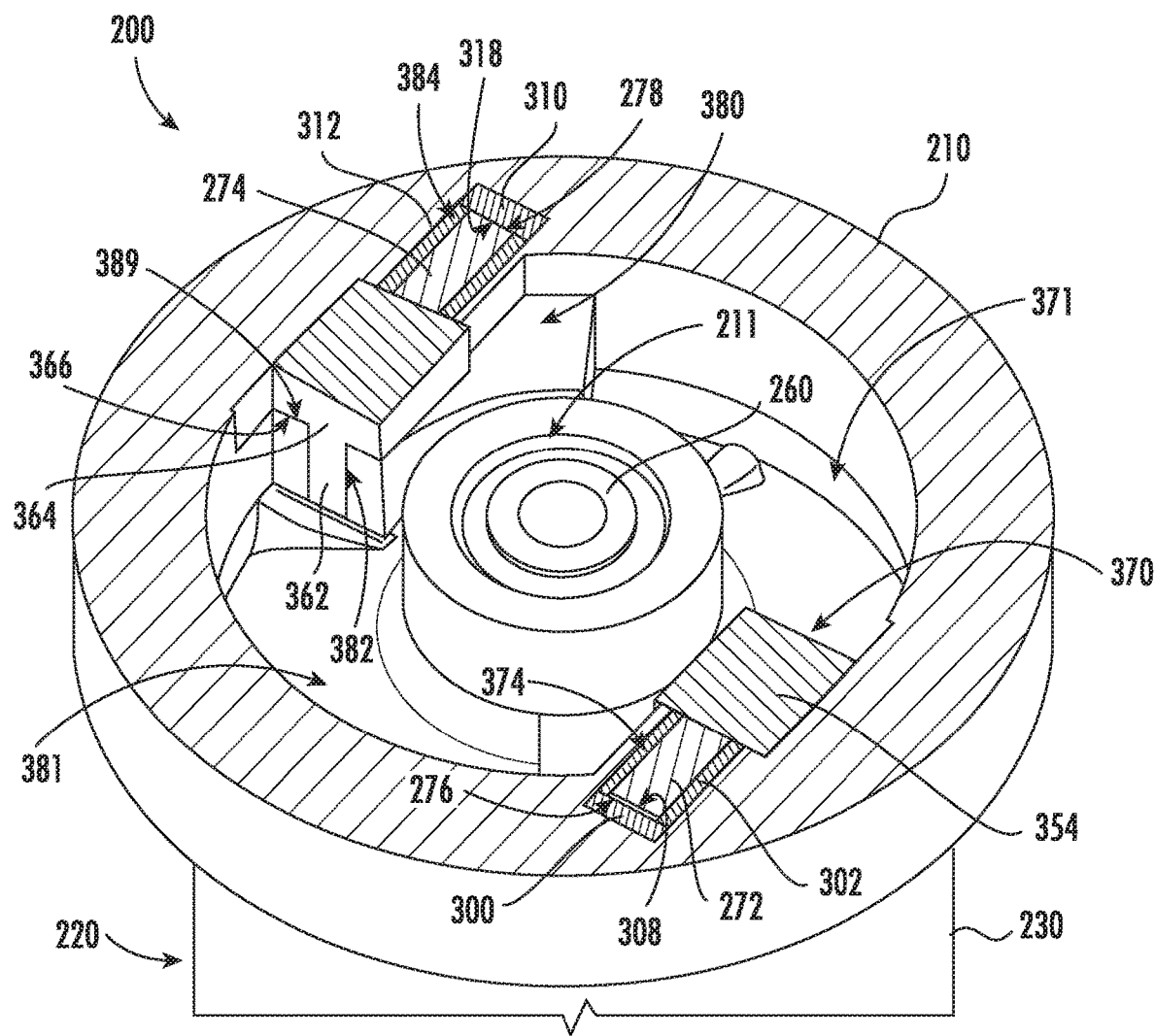
FIG. 17 provides a close up, perspective cross sectional view of the filter cartridge of FIG. 14 mounted to the manifold of FIG. 15.

FIGS. 14, 15, 16, and 17 provide another exemplary embodiment of water filter assembly 200. In particular, FIG. 14 provides a close up view of top portion 250 of filter cartridge 220. FIG. 15 provides a bottom perspective view of manifold 210. FIG. 16 provides a close up, perspective cross sectional view of manifold 210. FIG. 17 provides a close up, perspective cross sectional view of filter cartridge 220 mounted to manifold 210. The exemplary water filter assembly 200 of FIGS. 14 through 17 is configured in a similar manner as the water filter assembly of FIGS. 3 through 10, and accordingly, the same or similar reference numerals will refer to the same or similar parts.

By contrast with the water filter assembly of FIGS. 3 through 10, housing 230 of water filter assembly 200 of FIGS. 14 through 17 includes a first retention member 350 and a second retention member 360 projecting from a body of housing 230 at top portion 250 of filter cartridge 220 (FIG. 14). First retention member 350 is spaced from second retention member 360, e.g., along the circumferential direction C, and is positioned radially opposite of second retention member 360.

As shown particularly in FIG. 14, for this embodiment, first retention member 350 includes a stem 352 that projects from the body of housing 230 generally along the axial direction A and has a head 354 extending from the distal end of stem 352. Proximal end 275 of first magnetic member 272 is retained by head 354 of first retention member 350. First magnetic member 272 extends from first retention member 350 along a first direction that is orthogonal to the axial direction A. Similarly, second retention member 360 includes a stem 362 that projects from the body of housing 230 generally along the axial direction A and has a head 364 extending from the distal end of stem 362. Proximal end 277 of second magnetic member 274 is retained by head 364 of second retention member 360. Second magnetic member 274 extends from second retention member 360 along a second direction that is orthogonal to the axial direction A. Further, as depicted, first magnetic member 272 and second magnetic member 274 extend in opposite directions, e.g., along the circumferential direction C or along a first radial direction R1, from their respective first and second retention members 350, 360. That is, for this embodiment, the first direction and the second direction are opposite directions. In some exemplary embodiments, the first direction and the second direction are substantially opposite directions along the radial direction R, e.g., the first radial direction R1.

As shown in FIGS. 15 and 16, for this exemplary embodiment, a bottom wall 213 of manifold 210 defines a first slot 371 extending along the circumferential direction C and a second slot 372 extending along and spaced from the first slot 371 along the circumferential direction C. As depicted first slot 371 extends about one hundred ten degrees (110°) along the circumferential direction C and extends about the opening to main chamber 211. Likewise, second slot 372 extends about one hundred ten degrees (110°) along the circumferential direction C and extends about the opening to main chamber 211 as well. First and second slots 371, 372 are positioned radially opposite one another. First slot 371 is configured to receive first retention member 350 and first magnetic member 272 and second slot 372 is configured to receive second retention member 360 and second magnetic member 274 when filter cartridge 220 is mounted to manifold 210.

Further, manifold 210 includes a first mounting housing 370 and a second mounting housing 380 extending from an annular wall 215 of manifold 210. First mounting housing 370 is spaced from second mounting housing 380, e.g., along the circumferential direction C, and is positioned radially opposite of second mounting housing 380. In this way, first mounting housing 370 is configured to receive first magnetic member 272 and second mounting housing 380 is configured to receive second magnetic member 274, which as noted above, is positioned radially opposite of first magnetic member 272.

First mounting housing 370 defines a groove 372 that is shaped complementary to stem 352 of first retention member 350. In this way, stem 352 may be received within groove 372 when filter cartridge 220 is mounted to manifold 210. First mounting housing 370 and annular wall 215 of manifold 210 together define a first cavity 374 that extends between an open end 376 and a blind end 378 along a direction that is substantially orthogonal to the axial direction A. First cavity 374 has a generally cylindrical shape. First magnet 300 and first conducting coil 302 are disposed within first cavity 374. In particular, first magnet 300 is disposed within first cavity 374 at or proximate blind end 378 and first conducting coil 302 extends from open end 376 to first magnet 300 positioned at blind end 378 of first cavity 374. Although not shown, an annular first cap may be positioned at open end 376 to retain first conducting coil 302 within first cavity 374. Further, first cavity 374 is sized to receive first magnetic member 272 of filter cartridge 220 of filter cartridge 220, e.g., when filter cartridge 220 is mounted to manifold 210.

Similar to first mounting housing 370, second mounting housing 380 defines a groove 382 that is shaped complementary to stem 362 of second retention member 360. In this way, stem 362 may be received within groove 382 when filter cartridge 220 is mounted to manifold 210. Second mounting housing 380 and annular wall 215 of manifold 210 together define a second cavity 384 that extends between an open end 386 and a blind end 388 along a direction that is substantially orthogonal to the axial direction A. Second cavity 374 has a generally cylindrical shape. Second magnet 310 and second conducting coil 312 are disposed within second cavity 384. In particular, second magnet 310 is disposed within second cavity 384 at blind end 388 and second conducting coil 312 extends from open end 386 to second magnet 310 positioned at blind end 388 of first cavity 374. Although not shown, an annular second cap may be positioned at open end 386 to retain second conducting coil 312 within second cavity 384. Further, second cavity 384 is sized to receive second magnetic member 274 of filter cartridge 220, e.g., when filter cartridge 220 is mounted to manifold 210.

With reference to FIG. 17, filter cartridge 220 may be mounted to manifold 210 in a similar manner as described above except as provided below. For this embodiment, neck 260 of filter cartridge 220 and sleeve 240 (not shown) are inserted into main chamber 211 of manifold 210 while first retention member 250 and first magnetic member 272 attached thereto are inserted into first slot 371 and second retention member 260 and second magnetic member 274 attached thereto are inserted into second slot 381. Thereafter, filter cartridge 220 is rotated about the axial direction A. In particular, when filter cartridge 220 is rotated about the axial direction A, stem 352 of first retention member 350 is received within groove 372 of first mounting housing 370 (not shown in FIG. 17), and at the same time, stem 362 of second retention member 360 is received within groove 382 of second mounting housing 380. As filter cartridge 220 is further rotated about the axial direction A, first magnetic member 272 is inserted into and received within first cavity 374 and second magnetic member 274 is inserted into and received within second cavity 384. The rotation of filter cartridge 220 about the axial direction A is stopped when first magnetic member 272 contacts first magnet 300 and second magnetic member 274 contacts second magnet 310.

When first magnetic member 272 is received within first cavity 374, first magnet 300 magnetizes first magnetic member 272, and as a result, first magnetic member 272 is attracted to first magnet 300. Such magnetic attraction holds and secures filter cartridge 220 to manifold 210. In addition, when first magnetic member 272 is received within first cavity 374, first conducting coil 302 surrounds at least a portion of first magnetic member 272. Similarly, when second magnetic member 274 is received within second cavity 384, second magnet 310 magnetizes second magnetic member 274, and consequently, second magnetic member 274 is attracted to second magnet 310. Further, when second magnetic member 274 is received within second cavity 384, second conducting coil 312 surrounds at least a portion of second magnetic member 274.

Moreover, when filter cartridge 220 is fully rotated in place, overhang surfaces 356 of head 354 of first retention member 350 (FIG. 14) contact support surfaces 379 of first mounting housing 370 (FIG. 16). The mating engagement between overhang surfaces 356 and support surfaces 379 further secures filter cartridge 220 to manifold 210 and supports at least a portion of the weight of filter cartridge 220. In a similar fashion, when filter cartridge 220 is fully rotated in place, overhang surfaces 366 of head 364 of second retention member 360 contact support surfaces 389 of second mounting housing 380. The mating engagement between overhang surfaces 366 and support surfaces 389 further secures filter cartridge 220 to manifold 210 and supports at least a portion of the weight of filter cartridge 220. Advantageously, the magnetic attraction between magnetic members 272, 274 and their respective magnets 300, 310 and the mating engagement of the overhang surfaces 356, 366 with their respective support surfaces 379, 389 secures filter cartridge 220 with manifold 210 in such a way that filter cartridge 220 may be secured and held in place with manifold 210 despite relatively high inlet water pressures, such as e.g., one hundred twenty pounds per square inch (120 psi).

Filter cartridge 220 may be removed from manifold 210 in a similar manner as described above except as provided below. For this embodiment, after ensuring the water flow to manifold 210 is shut off, first magnetic member 272 is released from first magnet 300 and second magnetic member 274 is released from second magnet 310 as described above (e.g. electric current may be directed to first conducting coil 302 such that the magnetic polarity of contact surface 308 of first magnet 300 is the same as distal end 276 of first magnetic member 272 and/or electric current may be directed to second conducting coil 312 such that the magnetic polarity of contact surface 318 of second magnet 310 is the same as distal end 278 of second magnetic member 274). As noted, electric current is needed only momentarily to release filter cartridge 220 from manifold 210. Once first magnetic member 272 is released from first magnet 300 and second magnetic member 274 is released from second magnet 310, a user may rotate filter cartridge 220 about the axial direction A, e.g., in a direction about the axial direction A that is opposite the direction used during mounting of filter cartridge 220 with manifold 210. As filter cartridge 220 is rotated about the axial direction A, first magnetic member 272 is removed from first cavity 374, and similarly, second magnetic member 274 is removed from second cavity 384. As filter cartridge 220 is rotated further about the axial direction A, stem 352 of first retention member 350 is removed from groove 372 of first mounting housing 370, and simultaneously, stem 362 of second retention member 360 is removed from groove 382 of second mounting housing 380. Once first magnetic member 272 clears first mounting housing 370 and second magnetic member 274 clears second mounting housing 380, a user may move filter cartridge 220 downward along the axial direction A from manifold 210.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly, comprising:
    a manifold defining a cavity;
    a magnet disposed within the cavity;
    a conducting coil disposed within the cavity, the conducting coil in electrical communication with a power supply;
    a filter cartridge removably mounted to the manifold and comprising a housing that defines a chamber;
    a filter media disposed within the chamber;
    a magnetic member projecting from the housing of the filter cartridge, wherein when the filter cartridge is mounted to the manifold, the magnetic member is received within the cavity of the manifold such that the conducting coil surrounds at least a portion of the magnetic member and the magnetic member is attracted to the magnet.

2. The water filter assembly of claim 1, wherein the magnetic member is formed of a ferromagnetic material.

3. The water filter assembly of claim 1, wherein the cavity defined by the manifold is a first cavity, the magnet is a first magnet, the conducting coil is a first conducting coil, and the magnetic member is a first magnetic member, and wherein the manifold defines a second cavity, and wherein the water filter assembly further comprises:
    a second magnet disposed within the second cavity;
    a second conducting coil disposed within the second cavity, the second conducting coil in electrical communication with the power supply;
    a second magnetic member extending from the housing of the filter cartridge, wherein when the filter cartridge is mounted to the manifold, the second magnetic member is received within the second cavity of the manifold such that the second conducting coil surrounds at least a portion of the second magnetic member and the second magnetic member is attracted to the second magnet.

4. The water filter assembly of claim 3, wherein the water filter assembly defines an axial direction, and wherein the first magnetic member has a length extending from the housing along the axial direction and the second magnetic member has a length extending from the housing along the axial direction.

5. The water filter assembly of claim 3, wherein the water filter assembly defines a radial direction, and wherein the first magnetic member extends from the housing radially opposite of the second magnetic member.

6. The water filter assembly of claim 1, further comprising:
    an activation member in electrical communication with the conducting coil and the power supply, wherein when the activation member is activated, the power supply is configured to direct an electric current through the conducting coil.

7. The water filter assembly of claim 1, wherein the manifold defines a groove, and wherein the filter cartridge further comprises:
    a snap member extending from the housing, wherein when the filter cartridge is mounted to the manifold, the snap member is received within the groove of the manifold and snaps into place to secure the filter cartridge to the manifold.

8. The water filter assembly of claim 7, wherein the snap member comprises a head having a ramped wedge.

9. The water filter assembly of claim 1, wherein the cavity defined by the manifold comprises a first step portion having a diameter, a second step portion contiguous with and adjacent to the second step portion and having a diameter that is less than the diameter of the first step portion, and a third step portion contiguous with and adjacent to the second step portion and having a diameter that is less than the diameter of the second step portion, wherein the magnet is disposed within the third step portion of the cavity and the conducting coil is disposed within the second step portion of the cavity.

10. The water filter assembly of claim 1, wherein the manifold defines an inlet, and outlet, and a main chamber, and wherein the water filter assembly further comprises:
    a chute defining an inlet passage and an outlet passage, the chute movable within the main chamber between a first position and a second position, and wherein when the chute is in the first position, the inlet passage of the chute is not in fluid communication with the inlet and the outlet passage of the chute is not in fluid communication with the outlet and wherein when the chute is in the second position, the inlet passage of the chute is in fluid communication with the inlet and the outlet passage of the chute is in fluid communication with the outlet.

11. A water filter assembly defining an axial direction, a radial direction, and a circumferential direction, the water filter assembly comprising:
    a manifold comprising a first mounting housing defining a first cavity and a second mounting housing defining a second cavity;
    a first magnet disposed within the first cavity;
    a second magnet disposed within the second cavity;
    a first conducting coil disposed within the first cavity, the first conducting coil in electrical communication with a power supply;
    a second conducting coil disposed within the second cavity, the second conducting coil in electrical communication with the power supply;
    a filter cartridge removably mounted to the manifold and defining a chamber, the filter cartridge comprising a housing;
    a filter media disposed within the chamber;
    a first magnetic member projecting from the housing in a first direction that is substantially orthogonal to the axial direction; and
    a second magnetic member projecting from the housing in a second direction that is substantially orthogonal to the axial direction;

wherein when the filter cartridge is mounted to the manifold, the first magnetic member is received within the first cavity such that the first conducting coil surrounds at least a portion of the first magnetic member and the first magnetic member is attracted to the first magnet and the second magnetic member is received within the second cavity such that the second conducting coil surrounds at least a portion of the second magnetic member and the second magnetic member is attracted to the second magnet.

12. The water filter assembly of claim 11, wherein the manifold comprises a bottom wall, and wherein the bottom wall of the manifold defines a first slot extending along the circumferential direction and a second slot extending along and spaced from the first slot along the circumferential direction, wherein when the filter cartridge is mounted to the manifold, the first slot receives the first magnetic member and the second slot receives the second magnetic member.

13. The water filter assembly of claim 11, wherein the first cavity extends between an open end and a blind end along a direction that is substantially orthogonal to the axial direction and the second cavity extends between an open end and a blind end along the direction that is substantially orthogonal to the axial direction, and wherein the first magnet is disposed at the blind end of the first cavity and the second magnet is disposed at the blind end of the second cavity.

14. The water filter assembly of claim 11, wherein the first direction and the second direction are substantially opposite directions along the radial direction.

15. The water filter assembly of claim 11, wherein the housing of the filter cartridge comprises:
a body;
a first retention member projecting from the body, the first retention member comprising a stem and a head, wherein the first magnetic member projects from the head of the first retention member along the first direction; and
a second retention member projecting from the body, the second retention member comprising a stem and a head, wherein the second magnetic member projects from the head of the second retention member along the second direction.

16. The water filter assembly of claim 15, wherein the first mounting housing defines a first groove and the second mounting housing defines a second groove, wherein when the filter cartridge is mounted to the manifold, the first groove receives the stem of the first retention member and the second groove receives the stem of the second retention member.

17. The water filter assembly of claim 15, wherein the head of the first retention member comprises an overhang surface and the head of the second retention member comprises an overhang surface, and wherein the first mounting housing comprises a support surface and the second mounting housing comprises a support surface, and wherein when the when the filter cartridge is mounted to the manifold, the overhang surface of the first retention member is in mating engagement with the support surface of the first mounting housing and the overhang surface of the second retention member is in mating engagement with the support surface of the second mounting housing.

18. A water filter assembly for an appliance, the water filter assembly comprising:
a manifold defining a first cavity and a second cavity;
a first magnet disposed within the first cavity;
a second magnet disposed within the second cavity;
a first conducting coil disposed within the first cavity;
a second conducting coil disposed within the second cavity;
a filter cartridge removably mounted to the manifold and comprising a housing that defines a chamber;
a filter media disposed within the chamber;
a first magnetic member projecting from the housing of the filter cartridge;
a second magnetic member projecting from the housing of the filter cartridge, and
wherein when the filter cartridge is mounted to the manifold, the first magnetic member is received within the first cavity of the manifold such that the first conducting coil surrounds at least a portion of the first magnetic member and the first magnetic member is attracted to the magnet and the second magnetic member is received within the second cavity of the manifold such that the second conducting coil surrounds at least a portion of the second magnetic member and the second magnetic member is attracted to the second magnet.

19. The water filter assembly of claim 18, wherein the water filter assembly defines an axial direction, and wherein the first magnetic member has a length extending from the housing along the axial direction and the second magnetic member has a length extending from the housing along the axial direction.

20. The water filter assembly of claim 18, wherein the water filter assembly defines a radial direction, and wherein the first magnetic member extends from the housing radially opposite of the second magnetic member.

\* \* \* \* \*